(12) United States Patent
Sole Rojals et al.

(10) Patent No.: US 9,386,307 B2
(45) Date of Patent: Jul. 5, 2016

(54) GROUPING OF BYPASS-CODED BINS FOR SAO SYNTAX ELEMENTS

(71) Applicant: QUALCOMM Incorporated, San Diego, CA (US)

(72) Inventors: Joel Sole Rojals, San Diego, CA (US); In Suk Chong, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 429 days.

(21) Appl. No.: 13/767,676

(22) Filed: Feb. 14, 2013

(65) Prior Publication Data

US 2013/0336382 A1 Dec. 19, 2013

Related U.S. Application Data

(60) Provisional application No. 61/659,778, filed on Jun. 14, 2012, provisional application No. 61/664,607, filed on Jun. 26, 2012.

(51) Int. Cl.
*H04N 7/12* (2006.01)
*H04N 5/917* (2006.01)
(Continued)

(52) U.S. Cl.
CPC ......... *H04N 19/00139* (2013.01); *H04N 19/13* (2014.11); *H04N 19/136* (2014.11); *H04N 19/184* (2014.11); *H04N 19/70* (2014.11); *H04N 19/82* (2014.11)

(58) Field of Classification Search
CPC . H04N 19/00139; H04N 19/70; H04N 19/82; H04N 19/13; H04N 19/184; H04N 19/136
See application file for complete search history.

(56) References Cited

U.S. PATENT DOCUMENTS

2008/0246637 A1 10/2008 Chen et al.
2011/0280306 A1 11/2011 Zheludkov et al.
(Continued)

FOREIGN PATENT DOCUMENTS

| CA | 2795620 A1 | 10/2011 |
| TW | I353181 B | 11/2011 |
| TW | I355204 B | 12/2011 |

OTHER PUBLICATIONS

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.
(Continued)

*Primary Examiner* — Dave Czekaj
*Assistant Examiner* — Tsion B Owens
(74) *Attorney, Agent, or Firm* — Shumaker & Sieffert, P.A.

(57) ABSTRACT

A video encoder generates a sequence of sample adaptive offset (SAO) syntax elements for a coding tree block. The SAO syntax elements include regular context-adaptive binary arithmetic coding (CABAC) coded bins for a color component and bypass-coded bins for the color component. None of the bypass-coded bins is between two of the regular CABAC-coded bins in the sequence. The video encoder uses regular CABAC to encode the regular CABAC-coded bins and uses bypass coding to encode the bypass-coded bins. The video encoder outputs the SAO syntax elements in a bitstream. A video decoder receives the bitstream, uses regular CABAC to decode the regular CABAC-coded bins, uses bypass coding to decode the bypass-coded bins, and modifies a reconstructed picture based on the SAO syntax elements.

48 Claims, 7 Drawing Sheets

(51) Int. Cl.
  *H04N 19/136* (2014.01)
  *H04N 19/70* (2014.01)
  *H04N 19/13* (2014.01)
  *H04N 19/184* (2014.01)
  *H04N 19/82* (2014.01)

(56) References Cited

U.S. PATENT DOCUMENTS

| | | | |
|---|---|---|---|
| 2011/0317704 A1 | 12/2011 | Brown et al. | |
| 2012/0163452 A1 | 6/2012 | Horowitz | |
| 2012/0177107 A1 | 7/2012 | Fu et al. | |
| 2012/0230417 A1 | 9/2012 | Sole Rojals et al. | |
| 2012/0294353 A1* | 11/2012 | Fu et al. | 375/240.02 |
| 2013/0272389 A1* | 10/2013 | Sze et al. | 375/240.03 |

OTHER PUBLICATIONS

Chien, et al., "Intra mode coding for INTRA NxN", JCT-VC Meeting; MPEG Meeting; Apr. 27, 2012-Jul. 5, 2012; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-I0302, 4 pp.

Chuang, et al., "Non-CE1: Codeword reordering for last_significant_coeff_and last_significant_coeff y", JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-TSG.16); URL: http://wftp3.1tu.ant/av-arch/jctvc-site/, No. JCTVC-G201, 3 pp.

Fu, et al., "Non-CE1: Bug-fix of offset coding in SAO interleaving mode", JCT-VC Meeting; MPEG Meeting; Apr. 27, 2012-Jul. 5, 2012; Geneva; (Joint Collaborative Team on Video Coding of ISO/IEC JTC1/SC29/WG11 and ITU-T SG.16); URL: http://wftp3.1tu.int/av arch/jctvc-site/, No. JCTVC-10168, 3 pp.

International Preliminary Report on Patentability—PCT/US20131045458, The International Bureau of WIPO—Geneva, Switzerland, Oct. 1, 2014, 13 pp.

International Search Report and Written Opinion—PCT/US2013/045458—ISA/EPO—Sep. 16, 2013, 16 pp.

Kim, et al., "Grouping of bypass bins for last position coding of transform coefficients", JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-G554, 4 pp.

Maani, et al., "SAO Type Coding Simplification (JCTVC-I0246 version 3)," JCT-VC meeting; MPEG meeting; Apr. 27, 2012-Jul. 5, 2012; Geneva; (Joint Collaborative Team on Video Coding of ISO/IEC JTC1/SC29/WG11 and ITU-T SG.16), 4 pp.

Maani, et al., "SAO Type Coding Simplification (JCTVC-I0246 version 3-CD)", JCT-VC meeting; MPEG meeting; Apr. 27, 2012-Jul. 5, 2012; Geneva; (Joint Collaborative Team on Video Coding of ISO/IEC JTC1/SC29/WG11 and ITU-T SG.16 ), 3 pp.

Sole, et al., "AhG6: Bypass bins grouping in SAO", JCT-VC Meeting; MPEG Meeting; Nov. 7, 2012-Jul. 20, 2012; Stockholm; (Joint Collaborative Team on Video Coding of ISO/IEC JTC1/SC29/WG11 and ITU-T SG.16); URL: http://wftp3.itu.int/av-arch/jctvc-site/, No. JCTVC-J0054, XP030112416, 3 pp.

Sze, et al., "High Throughput CABAC Entropy Coding in HEVC", IEEE Transactions on Circuits and Systems for Video Technology, IEEE Service Center, Piscataway, NJ, US, vol. 22, No. 12, XP011487151, pp. 1778-1791.

Sze, et al., "Parallel Context Processing of Coefficient Level", JCT-VC Meeting; MPEG Meeting; Jul. 14, 2011-Jul. 22, 2011; Torino; (Joint Collaborative Team on Video Coding of ISO/IEC JTC1/SC29/WG11 and ITU-T SG.16 );URL: http://wftp3.itu.int/av-arch/jctvc-site/, No. JCTVC-F130, XP030009153, 4 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Second Written Opinion from International Application No. PCT/US2013/045458, dated Jul. 3, 2014, 6 pp.

Bross et al., "High efficiency video coding (HEVC) text specification draft 6," Joint Collaborative Team on Video Coding, JCTVC-H1003, Nov. 21-30, 2011, 259 pp.

Bross et al., "High efficiency video coding (HEVC) text specification draft 7," Joint Collaborative Team on Video Coding, JCTVC-I1003_D2, Apr. 27-May 7, 2012, 290 pp.

Bross et al., "High efficiency video coding (HEVC) text specification draft 8," Joint Collaborative Team on Video Coding, JCTVC-J1003_D7, Jul. 11-20, 2012, 261 pp.

Bross et al., "High efficiency video coding (HEVC) text specification draft 9," Joint Collaborative Team on Video Coding, JCTVC-K1003_v7, Oct. 10-19, 2012, 290 pp.

Bross et al., "Suggested bug-fixes for HEVC text specification draft 6," Joint Collaborative Team on Video Coding, JCTVC-I0030, Apr. 27-May 7, 2012, 270 pp.

Bross et al., "WD4: Working Draft 4 of High-Efficiency Video Coding," Joint Collaborative Team on Video Coding, JCTVC-F803_d2, Jul. 14-22, 2011, 226 pp.

Bross et al., "WD5: Working Draft 5 of High-Efficiency Video Coding," Joint Collaborative Team on Video Coding, JCTVC-G1103_d2, Nov. 21-30, 2011, 214 pp.

Chang, "A Novel Pipeline Architecture for H.264/AVC CABAC Decoder," IEEE Asia Pacific Conference on Circuits and Systems, Nov. 30, 2008-Dec. 3, 2008, 4 pp.

Chien et al., "Last position coding for CABAC," Joint Collaborative Team on Video Coding, JCTVC-G704, 7th Meeting: Geneva, Nov. 21-30, 2011, 4 pages.

Fu et al., "CE13: Sample Adaptive Offset with LCU-Independent Decoding," Joint Collaborative Team on Video Coding, JCTVC-E049, Mar. 16-23, 2011, 6 pp.

Huang et al., "BoG report on integrated text of SAO adoptions on top of JCTVC-I0030," Joint Collaborative Team on Video Coding, JCTVC-I0602, Apr. 27-May 7, 2012, 2 pp.

International Telecommunication Union, "Advanced video coding for generic audiovisual services," Standardization Sector of ITU, Jun. 2011, 674 pp.

Maani et al., "SAO Type Coding Simplification," Joint Collaborative Team on Video Coding, JCTVC-I0246, Apr. 27-May 7, 2012, 4 pp.

Wiegand et al.,"WD1: Working Draft 1 of High-Efficiency Video Coding", Joint Collaborative Team on Video Coding, JCTVC-C403, Oct. 7-15, 2010, 137 pp.

Wiegand et al., "WD2: Working Draft 2 of High-Efficiency Video Coding", Joint Collaborative Team on Video Coding, JCTVC-D503, Jan. 20-28, 2011, 153 pp.

Wiegand et al., "WD3: Working Draft 3 of High-Efficiency Video Coding," Joint Collaborative Team on Video Coding, JCTVC-E603, Mar. 16-23, 2011, 193 pp.

Taiwan Search Report and Translation of Replacement Claims from counterpart Taiwan Patent Application No. 102121204, dated Jan. 26, 2015, 13 pp.

Chien, et al., "Last position coding for CABAC," JCTVC-G704, 7th Meeting: Geneva, Nov. 21-30, 2011, 3 page.

Maani, et al., "SAO Type Coding Simplification (JCTVC-I0246)," JCT-VC meeting; MPEG meeting; Apr. 27-May 7, 2012; Geneva; (Joint Collaborative Team on Video Coding of ISO/IEC JTC1/SC29/WG11 and ITU-T SG.16), 3 pp.

* cited by examiner

GROUPING OF BYPASS-CODED BINS FOR SAO SYNTAX ELEMENTS

This application claims the benefit of U.S. Provisional Patent Application No. 61/659,778, filed Jun. 14, 2012, and U.S. Provisional Patent Application No. 61/664,607, filed Jun. 26, 2012, the entire content of both of which are incorporated herein by reference.

TECHNICAL FIELD

This disclosure relates to video coding and compression and, in particular, to the use of sample adaptive offsets in video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e. a video frame or a portion of a video frame) may be partitioned into video blocks, which may also be referred to as tree blocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

SUMMARY

In general, this disclosure describes techniques for signaling sample adaptive offset (SAO) syntax elements. In particular, a video encoder generates a sequence of SAO syntax elements for a coding tree block (CTB). The SAO syntax elements in the sequence include regular CABAC-coded bins for a color component and bypass-coded bins for the color component. None of the bypass-coded bins for the color component is between two of the regular CABAC-coded bins for the color component. That is, the bypass-coded bins for the color component are grouped together. The video encoder uses a regular context-adaptive binary arithmetic coding (CABAC) engine to encode the regular CABAC-coded bins and uses a bypass coding engine to encode the bypass-coded bins. The video encoder outputs the SAO syntax elements in a bitstream that includes an encoded representation of the video data. A video decoder receives the bitstream. The video decoder uses a regular CABAC engine to decode the regular CABAC-coded bins and uses a bypass coding engine to decode the bypass-coded bins. The video decoder applies the SAO syntax elements to modify a reconstructed pixel block of the CTB.

In one aspect, this disclosure describes a method for encoding video data. The method comprises generating a sequence of SAO syntax elements for a CTB. The SAO syntax elements in the sequence include regular CABAC-coded bins for at least one color component and bypass-coded bins for the at least one color component. None of the bypass-coded bins is between two of the regular CABAC-coded bins. The method also comprises encoding the SAO syntax elements. Encoding the SAO syntax elements comprises using regular CABAC to encode the regular CABAC-coded bins and using bypass coding to encode the bypass-coded bins. The method also comprises outputting the SAO syntax elements in a bitstream that includes an encoded representation of the video data.

In another aspect, this disclosure describes a video encoding device that comprises one or more processors configured to generate a sequence of SAO syntax elements for a CTB. The SAO syntax elements include regular CABAC-coded bins for at least one color component and bypass-coded bins for the at least one color component. None of the bypass-coded bins is between two of the regular CABAC-coded bins. The one or more processors are also configured to encode the SAO syntax elements. Encoding the SAO syntax elements comprises using regular CABAC to encode the regular CABAC-coded bins and using bypass coding to encode the bypass-coded bins. The one or more processors are also configured to output the SAO syntax elements in a bitstream that includes an encoded representation of video data.

In another aspect, this disclosure describes a video encoding device comprising means for generating a sequence of SAO syntax elements for a CTB, the SAO syntax elements including regular CABAC-coded bins for at least one color component and bypass-coded bins for the at least one color component. None of the bypass-coded bins is between two of the regular CABAC-coded bins. The video encoding device also comprises means for encoding the SAO syntax elements. Encoding the SAO syntax elements comprises using regular CABAC to encode the regular CABAC-coded bins and using bypass coding to encode the bypass-coded bins. The video encoding device also comprises means for outputting the SAO syntax elements in a bitstream that includes an encoded representation of video data.

In another aspect, this disclosure describes a computer-readable storage medium that stores instructions that, when executed by one or more processors of a video encoding device, configure the video encoding device to generate a sequence of SAO syntax elements for a CTB, the SAO syntax elements including regular CABAC-coded bins for at least one color component and bypass-coded bins for the at least one color component. None of the bypass-coded bins is between two of the regular CABAC-coded bins. The instructions also configure the video encoding device to encode the SAO syntax elements. Encoding the SAO syntax elements comprises using regular CABAC to encode the regular CABAC-coded bins and using bypass coding to encode the bypass-coded bins. The instructions also configure the video encoding device to output the SAO syntax elements in a bitstream that includes an encoded representation of video data.

In another aspect, this disclosure describes a method for decoding video data. The method comprises receiving a bitstream that includes a sequence of coded SAO syntax elements for a CTB, the SAO syntax elements including regular CABAC-coded bins for at least one color component and bypass-coded bins for the at least one color component. None of the bypass-coded bins is between two of the regular CABAC-coded bins. The method also comprises decoding the SAO syntax elements. Decoding the SAO syntax elements comprises using regular CABAC to decode the regular CABAC-coded bins and using bypass coding to decode the bypass-coded bins. In addition, the method comprises modifying a reconstructed pixel block of the CTB based on the SAO syntax elements.

In another aspect, this disclosure describes a video decoding device that comprises one or more processors configured to receive a bitstream that includes a sequence of coded SAO syntax elements for a CTB, the SAO syntax elements in the sequence including regular CABAC-coded bins for at least one color component and bypass-coded bins for the at least one color component. None of the bypass-coded bins is between two of the regular CABAC-coded bins. The one or more processors are also configured to decode the SAO syntax elements. Decoding the SAO syntax elements comprises using regular CABAC to decode the regular CABAC-coded bins and using bypass coding to decode the bypass-coded bins. The one or more processors are also configured to modify a reconstructed picture of video data based on the SAO syntax elements.

In another aspect, this disclosure describes a video decoding device comprising means for receiving a bitstream that includes a sequence of coded SAO syntax elements for a CTB, the SAO syntax elements including regular CABAC-coded bins for at least one color component and bypass-coded bins for the at least one color component. None of the bypass-coded bins is between two of the regular CABAC-coded bins. The video decoding device also comprises means for decoding the SAO syntax elements. Decoding the SAO syntax elements comprises using regular CABAC to decode the regular CABAC-coded bins and using bypass coding to decode the bypass-coded bins. The video decoding device also comprises means for modifying a reconstructed picture of video data based on the SAO syntax elements.

A computer-readable storage medium that stores instructions that, when executed by one or more processors of a video decoding device, configure the video decoding device to receive a bitstream that includes a sequence of coded SAO syntax elements for a CTB, the SAO syntax elements in the sequence including regular CABAC-coded bins for at least one color component and bypass-coded bins for the at least one color component. None of the bypass-coded bins is between two of the regular CABAC-coded bins. The instructions also configure the video decoding device to decode the SAO syntax elements. Decoding the SAO syntax elements comprises using regular CABAC to decode the regular CABAC-coded bins and using bypass coding to decode the bypass-coded bins. In addition, the instructions configure the video decoding device to modify a reconstructed picture of video data based on the SAO syntax elements.

The details of one or more examples of the disclosure are set forth in the accompanying drawings and the description below. Other features, objects, and advantages will be apparent from the description, drawings, and claims.

DETAILED DESCRIPTION

Figure 1:
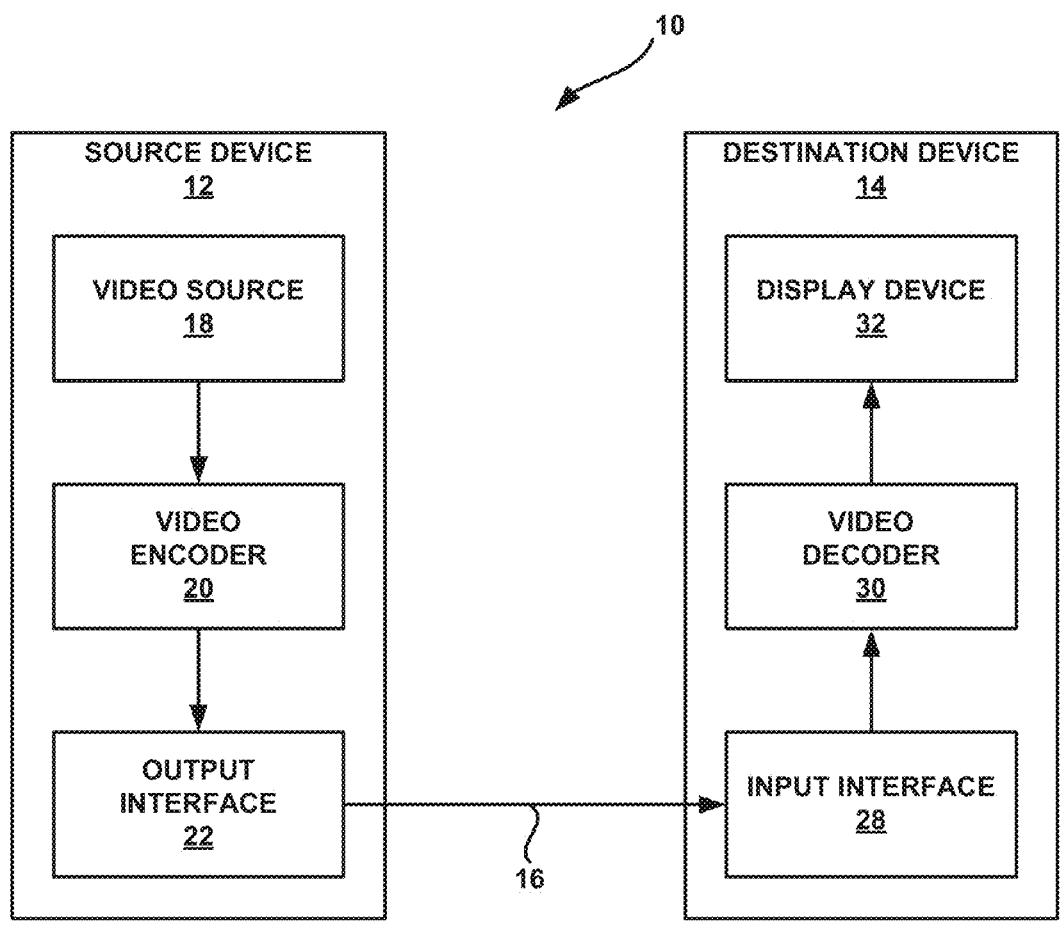
FIG. 1 is a block diagram illustrating an example video coding system that may utilize the techniques described in this disclosure.

During video encoding, a video encoder may use sample adaptive offsets (SAO). The use of SAO may improve coding efficiency during illumination changes. When the video encoder uses SAO, the video encoder may generate sequences of SAO syntax elements for coding tree blocks (CTBs) of the picture. The sequence of SAO syntax elements for a CTB may include SAO syntax elements for each color component of pixels. The color components of a pixel may include a luminance (luma) component and two chrominance (chroma) components. The video encoder may use context-adaptive binary arithmetic coding (CABAC) to encode the sequences of SAO syntax elements. More specifically, the video encoder may use regular CABAC encoding to encode bins of some of the SAO syntax elements and may use bypass encoding to encode bins of other ones of the SAO syntax elements. Bins encoded using bypass coding may be referred to as "bypass-coded bins." Bins encoded using regular CABAC coding may be referred to as "regular CABAC-coded bins."

To apply CABAC coding to a syntax element, a video coder typically binarizes the syntax element, i.e., to convert the value of the syntax element into a series of one or more bits, referred to as "bins." As part of the CABAC process, the video coder selects a coding context that identifies probabilities of coding bins having particular values. The video coder then arithmetically codes a bin based on the context. Bins coded using a regular CABAC coding may be referred to as regular CABAC-coded bins.

Instead of performing regular CABAC encoding on all syntax elements, or on all bins, a video coder may code some bins using bypass coding. Bypass coding generally refers to the process of arithmetically encoding a bin without using an adaptive context. That is, the bypass coding engine does not select contexts and may assume a probability of 0.5 for both symbols (0 and 1). Although bypass coding may not be as bandwidth-efficient as CABAC coding, it may be computationally less expensive to perform bypass coding on a bin rather than to perform CABAC coding. Further, performing bypass coding may allow for a higher degree of parallelization and throughput. Bins coded using bypass coding may be referred to as bypass-coded bins.

A CABAC entropy coder may include a regular coding engine to perform regular CABAC coding and a bypass coding engine to perform bypass coding. If a bin is CABAC-coded, the regular CABAC encoding engine codes the bin. If a bin is bypass-coded, the bypass coding engine codes the bin. In some cases, the regular CABAC encoding engine may need more one processing cycle to code a single bin. A bypass coding engine, on the other hand, may code multiple bins in a single cycle. Also, starting and restarting the CABAC coding engine may require processing overhead. Accordingly, it may be desirable to avoid frequent transitions between CABAC coding and bypass coding.

Existing syntaxes for SAO syntax elements do not group together the bypass-coded bins of color components. For instance, two bypass-coded SAO bins for a color component may be separated in the sequence by a regular CABAC-coded SAO bin for the color component. This may unnecessarily harm throughput because bypass encoding is more efficient on longer series of bypass-coded bins. In addition, as discussed above, transitioning back and forth between regular CABAC-coded syntax elements and bypass-coded syntax elements can be inefficient due to processing overhead consumed in starting and restarting the CABAC coding engine. Accordingly, it may be more efficient to group bypass-coded bins together, and group CABAC-coded bins together, within a sequence of syntax elements to be entropy coded.

In accordance with the techniques of this disclosure, a video encoder generates a sequence of SAO syntax elements for a CTB. The SAO syntax elements in the sequence include regular CABAC-coded bins for a color component and bypass-coded bins for the color component. No bypass-coded bin for the color component is between two regular CABAC-coded bins for the color component. The video encoder uses an entropy coder comprising a regular CABAC engine to encode the regular CABAC-coded bins and uses a bypass coding engine to encode the bypass-coded bins. The video encoder may output the CABAC-encoded SAO syntax elements in a bitstream that includes an encoded representation of video data. A video decoder may receive the bitstream, use a regular CABAC engine to decode the regular CABAC-coded bins, use a bypass coding engine to decode the bypass-coded bins, and modify a reconstructed pixel block of the CTB based on the SAO syntax elements.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words may merely be used to refer to different elements of a same or similar type.

FIG. 1 is a block diagram illustrating an example video coding system 10 that may utilize the techniques of this disclosure. As described herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses. Source device 12 and destination device 14 may comprise a wide range of devices, including desktop computers, mobile computing devices, notebook (e.g. laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media and/or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include to a storage medium that stores encoded video data generated by source device 12. In this example, destination device 14 may access the storage medium via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. The encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM). A draft of the upcoming HEVC standard, referred to as "HEVC Working Draft 6" or "WD6," is described in document JCTVC-H1003, Bross et al., "High efficiency video coding (IHEVC) text specification draft 6," Joint Collaborative Team on Video Coding (JCT-VC) of ITU-T SG16 WP3 and ISO/IEC JTC1/SC29/WG11, 8th Meeting: San Jose, Calif., USA, February, 2012, which, as of Dec. 26, 2012, is downloadable from http://phenix.int-evry.fr/jct/doc_end_user/documents/8_San%20Jose/wg11/JCTVC-IH1003-v22.zip, the entire content of which is incorporated herein by reference. Another draft of the upcoming HEVC standard, referred to as "HEVC Working Draft 9," is described in Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, China. October, 2012, which, as of Dec. 13, 2012, is downloadable from: http://phenix.int-evry.fr/jct/doc_end_user/documents/11_Shanghai/wg11/JCTVC-K1003-v8.zip, the entire content of which is incorporated herein by reference.

Alternatively, video encoder 20 and video decoder 30 may operate according to other proprietary or industry standards, including ITU-T H.261, ISO/IEC MPEG-1 Visual, ITU-T H.262 or ISO/IEC MPEG-2 Visual, ITU-T H.263, ISO/IEC MPEG-4 Visual and ITU-T 11.264 (also known as ISO/IEC MPEG-4 AVC), including its Scalable Video Coding (SVC) and Multiview Video Coding (MVC) extensions. The techniques of this disclosure, however, are not limited to any particular coding standard or technique.

Again, FIG. 1 is merely an example and the techniques of this disclosure may apply to video coding settings (e.g., video encoding or video decoding) that do not necessarily include any data communication between encoding and decoding devices. In other examples, data is retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data that represent encoded video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

As mentioned briefly above, video encoder 20 encodes video data. The video data may comprise one or more pictures. Each of the pictures may be a still image. In some instances, a picture may be referred to as a video "frame." Video encoder 20 may generate a bitstream that includes a sequence of bits that form a coded representation of the video data. The coded representation of the video data may include coded pictures and associated data. A coded picture is a coded representation of a picture. The associated data may include sequence parameter sets (SPSs), picture parameter sets (PPSs), and other syntax structures. A SPS may contain parameters applicable to zero or more sequences of pictures. A PPS may contain parameters applicable to zero or more pictures. A syntax structure may be a set of zero or more syntax elements present together in a bitstream in a specified order.

To generate an encoded representation of a picture, video encoder 20 may partition the picture into a grid of coding tree blocks (CTBs). In some instances, a CTB may be referred to as a "tree block", a "largest coding unit" (LCU) or a "coding tree unit." The CTBs of HEVC may be broadly analogous to the macroblocks of previous standards, such as H.264/AVC. However, a CTB is not necessarily limited to a particular size and may include one or more coding units (CUs).

Each of the CTBs may be associated with a different equally-sized block of pixels within the picture. Each pixel may comprise a luminance (luma) sample and two chrominance (chroma) samples. Thus, each CTB may be associated with a block of luminance samples and two blocks of chrominance samples. For ease of explanation, this disclosure may refer to a two-dimensional array of pixels as a pixel block and may refer to a two-dimensional array of samples as a sample block. Video encoder 20 may use quad-tree partitioning to partition the pixel block associated with a CTB into pixel blocks associated with CUs, hence the name "coding tree blocks."

The CTBs of a picture may be grouped into one or more slices. In some examples, each of the slices includes an integer number of CTBs. As part of encoding a picture, video encoder 20 may generate encoded representations of each slice of the picture (i.e., coded slices). To generate a coded slice, video encoder 20 may encode each CTB of the slice to generate encoded representations of each of the CTBs of the slice (i.e., coded CTBs).

To generate a coded CTB, video encoder 20 may recursively perform quad-tree partitioning on the pixel block associated with a CTB to divide the pixel block into progressively-smaller pixel blocks. Each of the smaller pixel blocks may be associated with a CU. A partitioned CU may be a CU whose pixel block is partitioned into pixel blocks associated with other CUs. A non-partitioned CU may be a CU whose pixel block is not partitioned into pixel blocks associated with other CUs.

Video encoder 20 may generate one or more prediction units (PUs) for each non-partitioned CU. Each of the PUs of a CU may be associated with a different pixel block within the pixel block of the CIT. Video encoder 20 may generate predictive pixel blocks for each PU of the CU. The predictive pixel block of a PU may be a block of pixels.

Video encoder 20 may use intra prediction or inter prediction to generate the predictive pixel block for a PU. If video encoder 20 uses intra prediction to generate the predictive pixel block of a PU, video encoder 20 may generate the predictive pixel block of the PU based on decoded pixels of the picture associated with the PU. If video encoder 20 uses inter prediction to generate the predictive pixel block of the PU, video encoder 20 may generate the predictive pixel block of the PU based on decoded pixels of one or more pictures other than the picture associated with the PU.

Video encoder 20 may generate a residual pixel block for a CU based on predictive pixel blocks of the PUs of the CU. The residual pixel block for the CU may indicate differences between samples in the predictive pixel blocks for the PUs of the CU and corresponding samples in the original pixel block of the CU.

Furthermore, as part of encoding a non-partitioned CU, video encoder 20 may perform recursive quad-tree partitioning on the residual pixel block of the CU to partition the residual pixel block of the CU into one or more smaller residual pixel blocks associated with transform units (TUs) of the CU. Because the pixels in the pixel blocks associated with the TUs each include a luma sample and two chroma samples, each of the TUs may be associated with a residual sample block of luma samples and two residual sample blocks of chroma samples.

Video coder 20 may apply one or more transforms to the residual sample blocks associated with the TUs to generate coefficient blocks (i.e., blocks of coefficients). Video encoder 20 may perform a quantization process on each of the coefficient blocks. Quantization generally refers to a process in which coefficients are quantized to possibly reduce the amount of data used to represent the coefficients, providing further compression.

Video encoder 20 may generate sets of syntax elements that represent the coefficients in the quantized coefficient blocks. Video encoder 20 may apply entropy encoding operations, such as Context-Adaptive Binary Arithmetic Coding (CABAC) operations, to at least some of these syntax elements.

To apply CABAC encoding to a syntax element, video encoder 20 may binarize the syntax element to form a binary string comprising a series of one or more bits, which are referred to as "bins." Video encoder 20 may use regular CABAC encoding to encode some of the bins and may use bypass encoding to encode other ones of the bins.

When video encoder 20 uses regular CABAC encoding to encode a sequence of bins, video encoder 20 may first identify a coding context. The coding context may identify probabilities of coding bins having particular values. For instance, a coding context may indicate a 0.7 probability of coding a 0-valued bin and a 0.3 probability of coding a 1-valued bin. After identifying the coding context, video encoder 20 may divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context.

If a bin of the syntax element has the value associated with the lower sub-interval, the encoded value may be equal to the lower boundary of the lower sub-interval. If the same bin of the syntax element has the value associated with the upper sub-interval, the encoded value may be equal to the lower boundary of the upper sub-interval. To encode the next bin of the syntax element, video encoder 20 may repeat these steps with the interval being the sub-interval associated with the value of the encoded bit. When video encoder 20 repeats these steps for the next bin, video encoder 20 may use modified probabilities based on the probabilities indicated by the identified coding context and the actual values of bins encoded.

When video encoder 20 uses bypass encoding to encode a sequence of bins, video encoder 20 may be able to code several bins in a single cycle, whereas when video encoder 20 uses regular CABAC encoding, video encoder 20 may be able to code only a single bin in a cycle. Bypass coding may be simpler because bypass coding does not require video encoder 20 to select contexts and may enable video encoder 20 to assume a probability of ½(50%) for both symbols (0 and 1). Consequently, in bypass coding, the intervals are split directly in half. Bypass coding, in effect, bypasses the context adaptive part of the arithmetic coding engine.

It may be computationally less expensive to perform bypass coding on a bin than to perform regular CABAC coding on the bin. Furthermore, performing bypass coding may allow for a higher degree of parallelization and throughput. Bins encoded using bypass coding may be referred to as "bypass-coded bins."

In addition to entropy encoding the syntax elements of a coefficient block, video encoder 20 may apply inverse quantization and inverse transforms to the transform block to reconstruct a residual sample block from the transform block. Video encoder 20 may add the reconstructed residual sample block to corresponding samples from one or more predictive sample blocks to produce a reconstructed sample block. By reconstructing the sample blocks for each color component, video encoder 20 may reconstruct a pixel block associated with a TU. By reconstructing pixel blocks for each TU of a CU in this way, video encoder 20 may reconstruct the pixel block of the CU.

After video encoder 20 reconstructs the pixel block of the CU, video encoder 20 may perform a deblocking operation to reduce blocking artifacts associated with the CU. After video encoder 20 performs the deblocking operation, video encoder 20 may use sample adaptive offsets (SAO) to modify the reconstructed pixel blocks of CTBs of the picture. In general, the addition of offset values to pixels in a picture may improve coding efficiency. After performing these operations, video encoder 20 may store the reconstructed pixel block of the CU in a decoded picture buffer for use in generating predictive pixel blocks for other CUs.

Video decoder 30 may receive a bitstream. The bitstream may include a coded representation of video data encoded by video encoder 20. Video decoder 30 may parse the bitstream to extract syntax elements from the bitstream. As part of extracting at least some syntax elements from the bitstream, video decoder 30 may entropy decode data in the bitstream.

When video decoder 30 performs CABAC decoding, video decoder 30 may perform regular CABAC decoding on some bins and may perform bypass decoding on other bins. When video decoder 30 performs regular CABAC decoding on a syntax element, video decoder 30 may identify a coding context. Video decoder 30 may then divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If the encoded value is within the lower sub-interval, video decoder 30 may decode a bin having the value associated with the lower sub-interval. If the encoded value is within the upper sub-interval, video decoder 30 may decode a bin having the value associated with the upper sub-interval. To decode a next bin of the syntax element, video decoder 30 may repeat these steps with the interval being the sub-interval that contains the encoded value. When video decoder 30 repeats these steps for the next bin, video decoder 30 may use modified probabilities based on the probabilities indicated by the identified coding context and the decoded bins. Video decoder 30 may then de-binarize the bins to recover the syntax element. De-binarzation may refer to selecting a syntax element value according to a mapping between the binary string and the syntax element value.

When video decoder 30 performs bypass decoding, video decoder 30 may be able to decode several bins in a single cycle, whereas when video decoder 30 performs regular CABAC decoding, video decoder 30 may generally only be able to decode a single bin in a cycle, or require more than one cycle for a single bin. Bypass decoding may be simpler than regular CABAC decoding because video decoder 30 does not need to select contexts and may assume a probability of ½ for both symbols (0 and 1). In this way, bypass bins may be computationally less expensive to encode and/or decode than the regular coded bins and may allow for higher degrees of parallelization and throughput.

Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements. For instance, video decoder 30 may generate, based on syntax elements associated with a CU, predictive pixel blocks for PUs of the CU. In addition, video decoder 30 may inverse quantize coefficient blocks associated with TUs of the CU. Video decoder 30 may perform inverse transforms on the coefficient blocks to reconstruct residual pixel blocks associated with the TUs of the CU. Video decoder 30 may reconstruct the pixel block of a CU based on the predictive pixel blocks and the residual pixel blocks.

After video decoder 30 has reconstructed the pixel block of a CU, video decoder 30 may perform a deblocking operation to reduce blocking artifacts associated with the CU. In addition, based on one or more SAO syntax elements, video decoder 30 may apply the SAO that was applied by video encoder 20. After video decoder 30 performs these operations, video decoder 30 may store the pixel block of the CU in a decoded picture buffer. The decoded picture buffer may provide reference pictures for subsequent motion compensation, intra prediction, and presentation on a display device.

Previous video coding standards, such as H.264, applied offset types and values uniformly across entire blocks or frames of pixels. SAO techniques proposed for HEVC may allow for different offset values to be applied to different pixels (or blocks) depending on pixel (or block) classification metrics. Possible classification metrics include activity metrics such as edge metrics and band metrics. A description of offset classifications can be found in C.-M. Fu, C.-Y. Chen, C.-Y. Tsai, Y.-W. Huang, S. Lei, "CE13: Sample Adaptive Offset with LCU-Independent Decoding," JCT-VC Contribution, E049, Geneva, February 2011, which is incorporated herein by reference in its entirety.

In a proposed SAO implementation for HEVC, each partition (which may consist of a set of CTBs) may have one of three offset types: no offset, band classification based offset types 0 or 1, and edge classification based types 0, 1, 2, or 3. The offset types may also be referred to as pixel classifications. Each band classification offset type has 16 possible offset values, while each edge classification based type has 4 possible offset values. If video encoder 20 chooses one of these offset types to be used for a partition, video encoder 20 may signal information indicating the corresponding offset type and the offset values in the bitstream.

Figure 2:
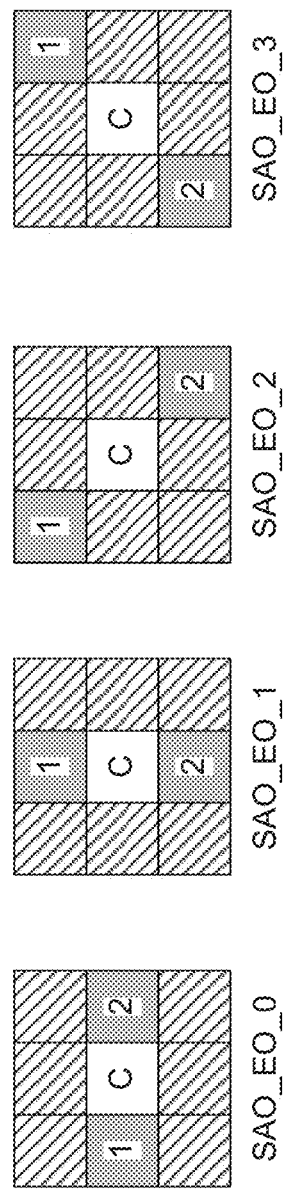
FIG. 2 is a conceptual diagram illustrating example edge offset classifications.

The edge offset type classifies each pixel based on edge information. FIG. 2 is a conceptual diagram showing the four possible edge offset classifications for HEVC. For each of the edge classifications shown in FIG. 2, an edge type for the current pixel is calculated by comparing the value of a current sample (C) to the values of neighboring samples (1 and 2). For SAO edge offset of classification zero (SAO_EO_0), the current sample is compared to the left and right neighbor samples. For SAO edge offset of classification one (SAO_EO_1), the current sample is compared to the top and bottom neighbor pixels. For SAO edge offset of classification two (SAO_EO_2), the current sample is compared to the upper left and bottom right neighbor samples. For SAO edge offset of classification three (SAO_EO_3), the current sample is compared to the bottom left and upper right neighbor samples.

Initially, the edge type of the current sample is assumed to be zero and if the value of the current sample C is equal to values of both the left and right neighbor samples (1 and 2), the edge type remains at zero. If the value of the current sample C is greater than the value of neighbor pixel 1, the edge type is increased by one. If the value of the current sample C is less than the value of neighbor sample 1, the edge type is decreased by one. Likewise, if the value of the current sample C is less than the value of neighbor pixel 2, the edge type is increased by one, and if the value of the current sample C is less than the value of the neighbor sample 2, the edge type is decreased by 1.

As such, the current sample C may have an edge type of either −2, −1, 0, 1, or 2. The edge type is −2 if the value of the current sample C is less than both values of neighbor pixels 1 and 2. The edge type is −1 if the value of the current sample C is less than one neighbor pixel, but equal to the other neighbor pixel. The edge type is 0 if the value of the current sample C is the same as both neighbor pixels, or if the value of the current sample C is greater than one neighbor sample, but less than the other neighbor sample. The edge type is 1 if the value of the current sample C is greater than one neighbor sample, but equal to the other neighbor pixel. The edge type is 2 if the value of the current sample C is greater than both values of neighbor samples 1 and 2. For each non-zero edge type value, four offset values are determined and signaled in the encoded video bitstream for use by a decoder (i.e. eoffset$_{-2}$, eoffset$_{-1}$, eoffset$_{1}$, eoffset$_{2}$).

Figure 3:
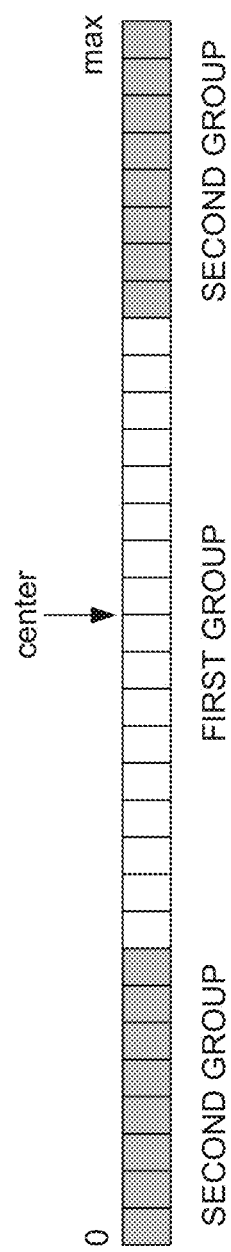
FIG. 3 is a conceptual diagram illustrating example band offset classifications.

In view of the above description, for each edge offset classification, edge type values may be computed with the following equations:

EdgeType=0;

if (C>Pixel 1)EdgeType=EdgeType+1;

if (C<Pixel 1)EdgeType=EdgeType−1;

if (C>Pixel 2)EdgeType=EdgeType+1;

if (C<Pixel 2)EdgeType=EdgeType−1;

FIG. 3 is a conceptual diagram showing example bands based on intensity value. For band offset, pixels are classified into different bands based on intensity. For band offset classification, pixels are categorized into 32 bands. The 16 bands in the center are classified into one group and the remaining bands are classified into a second group. For each group of bands, 16 offset values are determined and are signaled in the encoded video bitstream for use by a video decoder (i.e., boffset$_0$, . . . , boffsets$_{15}$).

In HEVC, several syntax elements may be used to code the data related to SAO and more specifically, to signal of the offset and band in SAO. The syntax table of these elements is found in Huang, "BoG report on integrated text of SAO adoptions on top of JCTVC-I0030," document no. JCTVC-I0602, available at http://phenix.int-evry.fr/jct/doc_end_user/current_document.php?id=5878, the entire content of which is incorporated herein by reference.

WD6 of the HEVC standard includes a syntax table (e.g., a process) sao_offset_cabac which is called for each color component (e.g., luma and chroma components of pixels). The sao_offset_cabac syntax table includes several syntax elements associated with SAO. These syntax elements include sao_type_idx, sao_band_position, sao_offset, and sao_offset_sign. The sao_type_idx syntax element indicates an SAO type of a current CTB for a color component cIdx. Table 1, below, indicates the relationships between values of the sao_type_idx syntax element and SAO offset types.

TABLE 1

| sao_type_idx[ cIdx ][ rx ][ ry ] | SAO type (informative) |
| --- | --- |
| 0 | Not applied |
| 1 | 1D 0-degree edge offset |
| 2 | 1D 90-degree edge offset |
| 3 | 1D 135-degree edge offset |
| 4 | 1D 45-degree edge offset |
| 5 | Band offset |

The sao_band_position syntax element indicates a displacement of a band offset of a pixel range. In some examples, the sao_offset_cabac syntax table only includes the sao_band_position syntax element if the sao_type_idx syntax element is equal to 5. The sao_offset syntax element indicates an offset value of the current CTB for a color component. Because there may be four sao_offset syntax elements per color component and three color components per pixel, there may be twelve sao_offset syntax elements for the current CTB. The sao_offset_sign syntax element indicates a sign value of the sao_offset syntax element for the current CTB. In some examples, the sao_offset_cabac syntax table only includes the sao_offset_sign syntax element if the sao_type_idx syntax element is equal to 5. Table 2, provided below, provides an example of the sao_offset_cabac syntax table.

TABLE 2

| sao_offset_cabac( rx, ry, cIdx ) { | Descriptor |
| --- | --- |
|   sao_type_idx[ cIdx ][ rx ][ ry ] | ae(v) |
|   if( sao_type_idx[ cIdx ][ rx ][ ry ] = = 5 ) | |
|     sao_band_position[ cIdx ][ rx ][ ry ] | ae(v) |
|   if( sao_type_idx[ cIdx ][ rx ][ ry ] != 0 ) { | |
|     for( i = 0; i < 4; i++ ) | |
|       sao_offset[ cIdx ][ rx ][ ry ][ i ] | ae(v) |
|   } | |
|   if( sao_type_idx[ cIdx ][ rx ][ ry ] = = 5 ) { | |
|     for( i = 0; i < 4; i++ ) { | |
|       if( sao_offset[ cIdx ][ rx ][ ry ] ! = 0 ) | |
|         sao_offset_sign[ cIdx ][ rx ][ ry ][ i ] | ae(v) |
|     } | |
|   } | |
| } | |

In some examples, video decoder 30 may perform a loop when parsing the SAO syntax elements of a CTB. During each cycle of the loop, video decoder 30 may invoke the syntax of Table 2 to parse a different color component, cIdx. A summary of the coding order of these syntax elements and the bin type (regular/bypass) is shown in Table 3, below.

TABLE 3

| Syntax element | Bin Type |
| --- | --- |
| 1. sao_type_idx | Regular |
| 2. sao_band_position (if band offset (BO)) | Bypass |
| 3. sao_offset (4) | Regular |
| 4. sao_offset_sign (4, if BO) | Bypass |

An alternate proposal described in document JCTVC-I0246, Maani et al, "SAO Type Coding Simplification," Joint Collaborative Team on Video Coding (JCTVC) of ITU-T SG16 WP 3 and ISO/IEC JTC 1SC 29/WG 11, 9$^{th}$ Meeting, Geneva, Switzerland, April 2012, which as of Dec. 19, 2012, is downloadable from http://phenix.int-evry.fr/jct/doc_end_user/documents/9_Geneva/wg11/JCTVC-I0246-v3.zip, the entire content of which is incorporated herein by reference. In the proposal of JCTVC-I0246, the sao_offset_cabac syntax table uses additional syntax elements to perform SAO. In the proposal of JCTVC-I0246, the sao_type_idx syntax element is split into four parts to account for the varying meaning of the sao_type_idx syntax element, depending on the value of the sao_type_idx syntax element. For example, the syntax elements in the sao_offset_cabac syntax table may include sao_on_switch, sao_type_idx, sao_offset, sao_offset_sign, and sao_subtype_idx. In this example, the sao_on_switch syntax element indicates whether SAO is applied to the current CTB. For instance, the sao_on_switch syntax element may be a 1-bit flag with a separate coding context that is used to track number of LCUs for which SAO is used. The sao_type_idx may be a 1 bit flag to indicate EO or BO when SAO is on. A coding context may be used to track the statistics of each type. This may be effective because BO statistics may change markedly from sequence to sequence. The sao_sub-type_idx is coded using fixed length codes and bypass mode. For BO the sao_subtype_idx is five bits and corresponds to the starting band while for EO the sao_subtype_idx is 2 bits and corresponds to one of the four directions. The sao_sub-type_idx syntax element indicates a direction in case of edge offset and the displacement of band offset. The offsets may have the same semantics as before. Four offsets may be coded regardless of the SAO type. The sao_type_idx, sao_offset, and sao_offset_sign syntax elements may have the same semantics as before.

In WD6 of the HEVC standard and in the alternate proposal described above, some of the syntax elements in the sao_off-set_cabac syntax table correspond to regular CABAC-coded bins and other ones of the syntax elements correspond to bypass-coded bins. In WD6 of the HEVC standard and the alternate proposal, the syntax elements for a color component in the sao_offset_cabac syntax table are not grouped on the basis of regular versus bypass-coded bins. For example, when the SAO type is the band offset (BO), i.e., sao_type_idx=5, then the band position and the signs are signaled. In that case, regular CABAC-coded bins for a color component and bypass-coded bins for the color component are not grouped together (as seen in Table 2). Because the syntax elements for the color component are not grouped on the basis of regular CABAC-coded bins versus bypass-coded bins, it may be more computationally expensive to encode and decode the sao_offset_cabac syntax table.

In addition, the sao_offset syntax element is coded fully using regular CABAC-coded bins. In the worst-case, 31 regular coded bins might be necessary for the sao_offset syntax element. Reducing this number or coding all or some of them in bypass mode may increase the throughput of video encoder 20 and/or video decoder 30, especially if the bins of the sao_offset syntax element are grouped together.

The techniques of this disclosure may resolve the issues described above and may improve throughput of video encoder 20 and video decoder 30. In accordance with the techniques of this disclosure, video encoder 20 may generate a sequence of SAO syntax elements for a CTB. The sequence of SAO syntax elements may include regular CABAC-coded bins for at least one color component and bypass-coded bins for the same at least one color component. Video encoder 20 generates the sequence such that none of the bypass-coded bin for the color component is between two regular CABAC-coded bins for the color component. Furthermore, in some examples, none of the regular CABAC-coded bins for the color component is between two of the bypass-coded bins for the color component. In this way, the bypass-coded bins for the color component may be grouped together. Video encoder 20 may encode the regular CABAC-coded bins using a regular CABAC coding engine. The regular CABAC coding engine may include one or more processors (e.g. software and/or hardware) that apply regular CABAC coding to the regular CABAC-coded bins. Video encoder 20 may encode the bypass-coded bins using a bypass coding engine. The bypass coding engine may include one or more processors that apply bypass coding to the bypass-coded bins. The regular CABAC coding engine and the bypass coding engine may form logical or physical parts of video encoder 20.

Similarly, in accordance with the techniques of this disclosure, video decoder 30 may receive a bitstream that includes a sequence of coded SAO syntax elements for a CTB. The SAO syntax elements may include regular CABAC-coded bins for at least one color component and bypass-coded bins for the at least one color component. None of the bypass-coded bins for the color component is between two of the regular CABAC-coded bins for the color component. Video decoder 30 may decode the SAO syntax elements. As part of decoding the SAO syntax elements, video decoder 30 may use a regular entropy coding engine to decode the regular CABAC-coded bins and may use a bypass entropy coding engine to decode the bypass-coded bins. Video decoder 30 may modify a reconstructed pixel block of the CTB based on the SAO syntax elements. The regular CABAC coding engine and the bypass coding engine may form logical or physical parts of video decoder 30.

Figure 4:
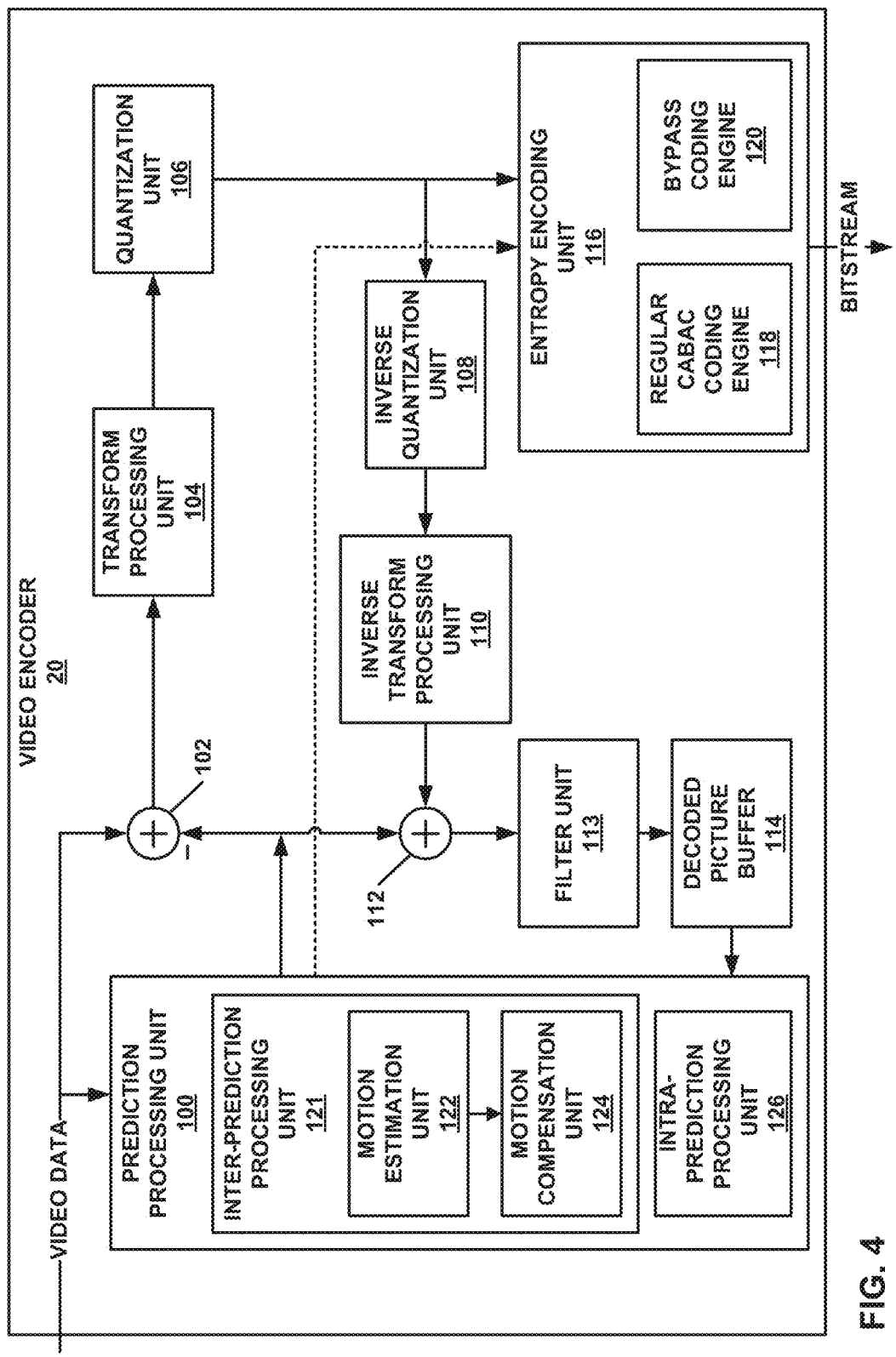
FIG. 4 is a block diagram illustrating an example video encoder that may implement the techniques described in this disclosure.

FIG. 4 is a block diagram that illustrates an example video encoder 20 that is configured to implement the techniques of this disclosure. FIG. 4 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 4, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 113, a decoded picture buffer 114, and an entropy encoding unit 116. Entropy encoding unit 116 includes a regular CABAC coding engine 118 and a bypass coding engine 120. Prediction processing unit 100 includes an inter-prediction processing unit 121 and an intra-prediction processing unit 126. Inter-prediction processing unit 121 includes a motion estimation unit 122 and a motion compensation unit 124. In other examples, video encoder 20 may include more, fewer, or different functional components.

Video encoder 20 receives video data. To encode the video data, video encoder 20 may encode each slice of each picture of the video data. As part of encoding a slice, video encoder 20 may encode each CTB in the slice. As part of encoding a CTB, prediction processing unit 100 may perform quad-tree partitioning on the pixel block associated with the CTB to divide the pixel block into progressively-smaller pixel blocks. The smaller pixel blocks may be associated with CUs. For example, prediction processing unit 100 may partition the pixel block of a CTB into four equally-sized sub-blocks, partition one or more of the sub-blocks into four equally-sized sub-sub-blocks, and so on.

Video encoder 20 may encode CUs of a CTB in a picture to generate encoded representations of the CUs (i.e., coded CUs). Video encoder 20 may encode the CUs of a CTB according to a z-scan order. In other words, video encoder 20 may encode a top-left CU, a top-right CU, a bottom-left CU, and then a bottom-right CU, in that order. When video encoder 20 encodes a partitioned CU, video encoder 20 may encode CUs associated with sub-blocks of the pixel block of the partitioned CU according to the z-scan order.

Furthermore, as part of encoding a CU, prediction processing unit 100 may partition the pixel block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 121 may generate predictive data for a PU by performing inter prediction on each PU of a CU. The predictive data for the PU may include a predictive pixel block that corresponds to the PU and motion information for the PU. Slices may be I slices, P slices, or B slices. Inter-prediction unit 121 may perform different operations for a PU of a CU depending on whether the PU is in an I slice, a P slice, or a B slice. In an I slice, all PUs are intra predicted. Hence, if the PU is in an I slice, inter-prediction unit 121 does not perform inter prediction on the PU.

If a PU is in a P slice, motion estimation unit 122 may search the reference pictures in a list of reference pictures (e.g., "list 0") for a reference block for the PU. The reference block of the PU may be a pixel block that most closely corresponds to the pixel block of the PU. Motion estimation unit 122 may generate a reference picture index that indicates the reference picture in list 0 containing the reference block of the PU and a motion vector that indicates a spatial displacement between the pixel block of the PU and the reference block. Motion estimation unit 122 may output the reference picture index and the motion vector as the motion information of the PU. Motion compensation unit 124 may generate the predictive pixel block of the PU based on the reference block indicated by the motion information of the PU.

If a PU is in a B slice, motion estimation unit 122 may perform uni-directional inter prediction or bi-directional inter prediction for the PU. To perform uni-directional inter prediction for the PU, motion estimation unit 122 may search the reference pictures of a first reference picture list ("list 0") or a second reference picture list ("list 1") for a reference block for the PU. Motion estimation unit 122 may output, as the motion information of the PU, a reference picture index that indicates a position in list 0 or list 1 of the reference picture that contains the reference block, a motion vector that indicates a spatial displacement between the pixel block of the PU and the reference block, and a prediction direction indicator that indicates whether the reference picture is in list 0 or list 1.

To perform bi-directional inter prediction for a PU, motion estimation unit 122 may search the reference pictures in list 0 for a reference block for the PU and may also search the reference pictures in list 1 for another reference block for the PU. Motion estimation unit 122 may generate reference picture indexes that indicate positions in list 0 and list 1 of the reference pictures that contain the reference blocks. In addition, motion estimation unit 122 may generate motion vectors that indicate spatial displacements between the reference blocks and the pixel block of the PU. The motion information of the PU may include the reference picture indexes and the motion vectors of the PU. Motion compensation unit 124 may generate the predictive pixel block of the PU based on the reference blocks indicated by the motion information of the PU.

Intra-prediction processing unit 126 may generate predictive data for a PU by performing intra prediction on the PU. The predictive data for the PU may include a predictive pixel block for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. To use an intra prediction mode to generate a set of predictive data for the PU, intra-prediction processing unit 126 may extend samples from sample blocks of neighboring PUs across the sample blocks of the PU in a direction associated with the intra prediction mode. The neighboring PUs may be above, above and to the right, above and to the left, or to the left of the PU, assuming a left-to-right, top-to-bottom encoding order for PUs, CUs, and CTBs. Intra-prediction processing unit 126 may use various numbers of intra prediction modes, e.g., 33 directional intra prediction modes. In some examples, the number of intra prediction modes may depend on the size of the pixel block of the PU.

Prediction processing unit 100 may select the predictive data for PUs of a CU from among the predictive data generated by inter-prediction processing unit 121 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive pixel blocks of the selected predictive data may be referred to herein as the selected predictive pixel blocks.

Residual generation unit 102 may generate, based on the pixel block of a CU and the selected predictive pixel blocks of the PUs of the CU, a residual pixel block of a CU. For instance, residual generation unit 102 may generate the residual pixel block of the CU such that each sample in the residual pixel block has a value equal to a difference between a sample in the pixel block of the CU and a corresponding sample in a selected predictive pixel block of a PU of the CU.

Prediction processing unit 100 may perform quad-tree partitioning to partition the residual pixel block of a CU into sub-blocks. Each undivided residual pixel block may be associated with a different TU of the CU. The sizes and positions of the residual pixel blocks associated with TUs of a CU may or may not be based on the sizes and positions of pixel blocks of the PUs of the CU.

Because the pixels of the residual pixel blocks of the TUs may comprise a luma sample and two chroma samples, each of the TUs may be associated with a block of luma samples and two blocks of chroma samples. Transform processing unit 104 may generate coefficient blocks for each TU of a CU by applying one or more transforms to the residual sample blocks associated with the TU. Transform processing unit 104 may apply various transforms to a residual sample block associated with a TU. For example, transform processing unit 104 may apply a discrete cosine transform (DCT), a directional transform, or a conceptually-similar transform to a residual sample block.

Quantization unit 106 may quantize the coefficients in a coefficient block. The quantization process may reduce the bit depth associated with some or all of the coefficients. For example, an n-bit coefficient may be rounded down to an m-bit coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU.

Inverse quantization unit 108 and inverse transform processing unit 110 may apply inverse quantization and inverse transforms to a coefficient block, respectively, to reconstruct a residual sample block from the coefficient block. Reconstruction unit 112 may add samples of the reconstructed residual sample block to corresponding samples from one or more predictive sample blocks generated by prediction processing unit 100 to produce a reconstructed sample block associated with a TU. By reconstructing sample blocks for each TU of a CU in this way, video encoder 20 may reconstruct the pixel block of the CU.

Filter unit 113 may perform a deblocking operation to reduce blocking artifacts in the pixel block associated with a CU. Furthermore, filter unit 113 may apply the SAO offsets determined by prediction processing unit 100 to the reconstructed sample block to restore the pixel block. Filter unit 113 may generate sequences of SAO syntax elements for CTBs. The SAO syntax elements may include regular CABAC-coded bins and bypass-coded bins. In accordance with the techniques of this disclosure, within the sequence, none of the bypass-coded bins for a color component is between two of the regular CABAC-coded bins for the same color component.

In some examples, filter unit 113 may generate a sao_offset_cabac syntax table that includes SAO syntax elements. Regular CABAC-coded bins and bypass-coded bins may be organized within the sao_offset_cabac syntax table such that none of the bypass-coded bins for a color component is between two of the regular CABAC-coded bins for the same color component. Furthermore, Table 4, below, provides an example of how video encoder 20 may generate a sequence of SAO syntax elements for a CTB such that none of the bypass-coded bins for a color component is between two of the regular CABAC-coded bins for the color component and such that none of the regular CABAC-coded bins for the color component is between two of the bypass-coded bins for the color component. In one example, the sao_offset_cabac syntax table may be arranged as shown in Table 4, below:

TABLE 4

| | Coding type |
|---|---|
| sao_offset_cabac( rx, ry, cIdx ) { | |
|   sao_type_idx[ cIdx ][ rx ][ ry ] | Regular |
|   if ( sao_type_idx[ cIdx ][ rx ][ ry ] != 0 ) { | |
|     for( i = 0; i < 4; i++ ) | |
|       sao_offset[ cIdx ][ rx ][ ry ][ i ] | Regular |
|   } | |
|   if( sao_type_idx[ cIdx ][ rx ][ ry ] == 5 ) { | |
|     for( i = 0; i < 4; i++ ) { | |
|       if( sao_offset[ cIdx ][ rx ][ ry ] != 0 ) | |
|         sao_offset_sign[ cIdx ][ rx ][ ry ][ i ] | Bypass |
|     } | |
|   } | |
|   if( sao_type_idx[ cIdx ][ rx ][ ry ] == 5 ) | |
|     sao_band_position[ cIdx ][ rx ][ ry ] | Bypass |
| } | |

In some examples, video decoder 30 may perform a loop when parsing the SAO syntax elements of a CTB. During each cycle of the loop, video decoder 30 may invoke the syntax of Table 4 to parse a different color component, cIdx. In the example of Table 4, the sao_band_position syntax elements, the sao_offset syntax elements, and the sao_offset_sign syntax elements may have the same semantics as described above. That is, the sao_type_idx syntax element indicates an offset type for a current CTB and color component. The sao_band_position syntax element indicates a displacement of a band offset of a pixel range. The sao_offset syntax element indicates an offset value of the current CTB and color component. The sao_offset_sign syntax element indicates a sign value of the sao_offset syntax element for the current CTB and color component.

Table 5, below, is another example of the sao_offset_cabac syntax table. In contrast to the example of Table 4, the example of Table 5 eliminates a conditional "if" statement.

TABLE 5

| | Coding type |
|---|---|
| sao_offset_cabac( rx, ry, cIdx ) { | |
|   sao_type_idx[ cIdx ][ rx ][ ry ] | Regular |
|   if( sao_type_idx[ cIdx ][ rx ][ ry ] != 0 ) { | |
|     for( i = 0; i < 4; i++ ) | |
|       sao_offset[ cIdx ][ rx ][ ry ][ i ] | Regular |
|   } | |
|   if( sao_type_idx[ cIdx ][ rx ][ ry ] == 5 ) { | |
|     for( i = 0; i < 4; i++ ) { | |
|       if( sao_offset[ cIdx ][ rx ][ ry ] != 0 ) | |
|         sao_offset_sign[ cIdx ][ rx ][ ry ][ i ] | Bypass |
|     } | |
|     sao_band_position[ cIdx ][ rx ][ ry ] | Bypass |
|   } | |
| } | |

In some examples, video decoder 30 may perform a loop when parsing the SAO syntax elements of a CTB. During each cycle of the loop, video decoder 30 may invoke the syntax of Table 5 to parse a different color component, cIdx. In the example syntax of Table 5, the syntax sao_offset may be coded using a truncated unary binarization with regular CABAC-coded bins. The number of regular CABAC-coded bins may be relatively large. For example, if the bit-depth of samples is ten bits, a CU may include 31 bins per offset (and there are 4 offsets). Therefore, in a worst case, these bins may be a substantial part of the coded bins in the bitstream.

A way to solve this issue is to split sao_offset into two syntax elements: sao_offset_prefix and sao_offset_suffix, where the prefix is coded using regular CABAC-coded bins and the suffix is coded using bypass-coded bins. In one example, the binarization of the sao_offset syntax element is the same as the one used for the last coefficient coding syntax element (as in HEVC and described in Wei-Jung Chien et al., "Last position coding for CABAC," document no. JCTVC-G704, Nov. 15, 2011, the entire content of which is incorporated herein by reference). In another example, the sao_offset syntax element is divided in a truncated unary prefix plus a fixed length code suffix. In still another example, the suffix is an exponential-golomb code, a rice-golomb code, or a truncated unary code. In still another example, the sao_offset syntax element is coded entirely in bypass bins, so only the suffix is present. In other words, the by-pass coded bins for a color component may include SAO offsets.

Table 6, below, is an example syntax of the sao_offset_cabac syntax table in which the sao_offset syntax element is split into a sao_offset_prefix syntax element and a sao_offset_suffix syntax element.

TABLE 6

| | Coding type |
|---|---|
| sao_offset_cabac( rx, ry, cIdx ) { | |
|   sao_type_idx[ cIdx ][ rx ][ ry ] | Regular |
|   if( sao_type_idx[ cIdx ][ rx ][ ry ] == 5 ) | |
|     sao_band_position[ cIdx ][ rx ][ ry ] | Regular |
|   if( sao_type_idx[ cIdx ][ rx ][ ry ] != 0 ) { | |
|     for( i = 0; i < 4; i++ ) | |
|       sao_offset_prefix[ cIdx ][ rx ][ ry ][ i ] | Regular |
|   } | |
|   if( sao_type_idx[ cIdx ][ rx ][ ry ] != 0 ) { | |
|     for( i = 0; i < 4; i++ ) | |
|       sao_offset_suffix[ cIdx ][ rx ][ ry ][ i ] | Bypass |
|   } | |

TABLE 6-continued

| | Coding type |
|---|---|
| if( sao_type_idx[ cIdx ][ rx ][ ry ] = = 5 ) {<br>  for( i = 0; i < 4; i++ ) {<br>    if( sao_offset[ cIdx ][ rx ][ ry ] != 0 )<br>      sao_offset_sign[ cIdx ][ rx ][ ry ][ i ]<br>    }<br>  }<br>} | <br><br><br>Bypass |

In some examples, video decoder 30 may perform a loop when parsing the SAO syntax elements of a CTB. During each cycle of the loop, video decoder 30 may invoke the syntax of Table 6 to parse a different color component, cIdx. In the example of Table 6, the sao_offset syntax element is divided in two syntax elements: sao_offset_prefix and sao_offset_suffix, where the prefix is coded using regular CABAC-coded bins and the suffix is coded using bypass-coded bins. In this example, the sao_band_offset syntax element can be positioned after the sao_offset_sign syntax element as in the example of Table 5. The SAO offset prefixes may be truncated unary prefixes and the SAO offset suffixes may be fixed-length codes. In some examples, the SAO offset suffixes are binarized as exponential Golomb codes, Rice-Golomb codes, or truncated unary codes.

In the example of Table 6, the sao_offset_suffix syntax elements are coded sequentially, thus grouping the bypass-coded bins for color components. As shown in the example of Table 7, below, the band offset can be put at the end, so that all bypass-coded bins for SAO for one color component are together.

TABLE 7

| | Coding type |
|---|---|
| sao_offset_cabac( rx, ry, cIdx ) {<br>  sao_type_idx[ cIdx ][ rx ][ ry ]<br>  if( sao_type_idx[ cIdx ][ rx ][ ry ] != 0 ) {<br>    for( i = 0; i < 4; i++ )<br>      sao_offset_prefix[ cIdx ][ rx ][ ry ][ i ]<br>  }<br>  if( sao_type_idx[ cIdx ][ rx ][ ry ] != 0 ) {<br>    for( i = 0; 1 < 4; i++ )<br>      sao_offset_suffix[ cIdx ][ rx ][ ry ][ i ]<br>  }<br>  if( sao_type_idx[ cIdx ][ rx ][ ry ] = = 5 ) {<br>    for( i = 0; i < 4; i++ ) {<br>      if( sao_offset[ cIdx ][ rx ][ ry ] != 0 )<br>        sao_offset_sign[ cIdx ][ rx ][ ry ][ i ]<br>    }<br>  }<br>  if( sao_type_idx[ cIdx ][ rx ][ ry ] = = 5 )<br>    sao_band_position[ cIdx ][ rx ][ ry ]<br>} | <br>Regular<br><br><br>Regular<br><br><br><br>Bypass<br><br><br><br><br>Bypass<br><br><br><br>Regular |

In some examples, video decoder 30 may perform a loop when parsing the SAO syntax elements of a CTB. During each cycle of the loop, video decoder 30 may invoke the syntax of Table 7 to parse a different color component, cIdx. In the example of Table 7, the bypass-coded bins for a color component are grouped together. Of course, different orders for the bypass-coded bins are possible. For example, the sao_offset_sign syntax elements may be coded first, then the sao_offset_suffix syntax elements, and finally, the sao_band_position syntax elements.

Thus, in the example syntax of Table 7, video encoder 20 may CABAC encode a SAO type index. Video encoder 20 may CABAC encode, after the SAO type index in coding order, a plurality of SAO offset prefixes using regular CABAC-coded bins. In addition, video encoder 20 may encode, after each of the SAO offset prefixes in coding order, a plurality of SAO offset suffixes using bypass-coded bins. Furthermore, in the example syntax of Table 7, video encoder 20 may encode, after the plurality of SAO offset suffixes in coding order, a plurality of SAO offset signs. In addition, video encoder 20 may encode, after the plurality of SAO offset signs in coding order, an SAO band position.

Likewise, video decoder 30 may decode a SAO type index. Video decoder 30 may decode, after the SAO type index in coding order, a plurality of SAO offset prefixes using regular CABAC-coded bins. In addition, video decoder 30 may decode, after each of the SAO offset prefixes in coding order, a plurality of SAO offset suffixes using bypass-coded bins. Furthermore, video decoder 30 may decode, after the plurality of SAO offset suffixes in coding order, a plurality of SAO offset signs. In addition, video decoder 30 may decode, after the plurality of SAO offset signs in coding order, an SAO band position.

Table 8, below, is another example of the sao_offset_cabac syntax table. In this example, bypass bins may be grouped for the coding method described in JCTVC-I0246. That is, JCTVC-I0246 describes coding, in the third step, the sub-type index, which may be sao_band_position or the EO index, depending on the SAO type. Both sub-type indexes (band position or EO index) are coded in bypass. Therefore, both can be coded after the SAO offset and signs, so bypass bins are coded together. Table 8 is an example syntax that includes a SAO on switch syntax element, a SAO type index syntax element, a plurality of SAO offset syntax elements, and a SAO subtype index syntax element. The SAO subtype index syntax element may indicate a direction if the SAO type index indicates an edge offset and a displacement of a band offset if the SAO type index syntax element indicates a band offset.

TABLE 8

| | Coding type |
|---|---|
| sao_offset_cabac( rx, ry, cIdx ) {<br>  sao_on_switch [ cIdx ][ rx ][ ry ]<br>  if (sao_on_switch [ cIdx ][ rx ][ ry ]) {<br>    sao_type_idx[ cIdx ][ rx ][ ry ]<br>    for( i = 0; i < 4; i++)<br>      sao_offset[ cIdx ][ rx][ ry ][ i ]<br>    if( sao_type_idx[ cIdx ][ rx ][ ry ] = = 1 ) {<br>      for( i = 0; i < 4; i++) {<br>        if( sao_offset[ cIdx ][ rx ][ ry ] [ i ] != 0 )<br>          sao_offset_sign[ cIdx ][ rx ][ ry ][ i ]<br>      }<br>    }<br>    if( sao_type_idx[ cIdx ][ rx ][ ry ] = =1 )<br>      sao_subtype_idx[ cIdx ][ rx ][ ry ]<br>    Else<br>      sao_subtype_idx[ cIdx ][ rx ][ ry ]<br>  }<br>} | <br>Regular<br><br>Regular<br><br>Regular<br><br><br><br>Bypass<br><br><br><br><br>Bypass<br><br>Bypass |

In some examples, video decoder 30 may perform a loop when parsing the SAO syntax elements of a CTB. During each cycle of the loop, video decoder 30 may invoke the syntax of Table 8 to parse a different color component, cIdx. In the example syntax of Table 8, bypass-coded bins are grouped together, despite the SAO type. Furthermore, in the example of Table 8, the sao_on_switch [cIdx][rx][ry] syntax element indicates whether SAO is applied to the CTB at position rx and ry for the color component cIdx. The sao_type_idx[cIdx][rx][ry] syntax element indicates the offset type of the current CTB at position rx and ry for the color component cIdx. If the sao_type_idx[cIdx][rx][ry] syntax element is equal to 0, edge offset is used to apply SAO. If the sao_type_idx[cIdx][rx][ry] syntax element is equal to 1, band offset may be used to apply SAO. A video coder may track statistics for use in selecting a context for regular CABAC coding the sao_type_idx syntax elements. Because the statistics may change significantly between different sequences of pictures, selection of a context for regular CABAC coding the sao_type_idx syntax elements may improve coding efficiency.

When the sao_type_idx[cIdx][rx][ry] syntax element is not present, the sao_type_idx[cIdx][rx][ry] syntax element may be inferred as follows. If the sao_merge_up_flag syntax element is equal to 1, the sao_type_idx[cIdx][rx][ry] syntax element is set equal to the sao_type_idx[cIdx][rx][ry−1] syntax element. Otherwise, the sao_type_idx[cIdx][rx][ry] syntax element is set equal to the sao_type_idx[cIdx][rx−1][ry] syntax element.

Furthermore, in the example syntax of Table 8, the sao_offset_cabac syntax table includes a sao_subtype_idx[cIdx][rx][ry] syntax element if the sao_on_switch syntax element is equal to 1. If the sao_type_idx[cIdx][rx][ry] syntax element is equal to 1 (i.e. band offset), the sao_subtype_idx[cIdx][rx][ry] syntax element may be represented as a 5-bit value and may be encoded in bypass mode. If the sao_type_idx[cIdx][rx][ry] syntax element is equal to 0 (i.e., edge offset), the sao_subtype_idx[cIdx][rx][ry] syntax element may be represented as a 2-bit value and may be encoded in bypass mode. The sao_subtype_idx [cIdx][rx][ry] syntax element indicates, for color component cIdx and for the current CTB at position rx and ry, the direction in case of edge offset and the displacement of the band offset in case of band offset. Edge offset directions may be specified when sao_type_idx[cIdx][rx][ry]=0. Table 9, below, indicates example edge types for values of the sao_subtype_idx syntax element.

TABLE 9

| sao_subtype_idx[ cIdx ][ rx ][ ry ] | Edge type |
| --- | --- |
| 0 | 1D 0-degree edge |
| 1 | 1D 90-degree edge |
| 2 | 1D 135-degree edge |
| 3 | ID 45-degree edge |

Additionally, the variants described above can also be applied to the example syntax of Table 8. For example, the sao_offset syntax element can be split into a set of one or more prefix bins and a set of one or more suffix bins. The prefix may be CABAC coded, and the suffix may be bypass coded. In this example, the sao_offset_suffix syntax element, the sao_offset_sign syntax element and the sao_subtype_idx syntax element, which are bypass coded, are grouped. In the examples above, the grouping of bypass-coded bins occurs within each color component. In other words, video encoder 20 may generate SAO syntax elements for luma components and for both chroma components. The bypass-coded bins of SAO syntax elements are grouped within the SAO syntax elements for each color component. For example, the bypass-coded bins of SAO syntax elements for the luma component are grouped together within the SAO syntax elements for the luma components, the bypass-coded bins of SAO syntax elements for the Cb chroma component are grouped together within the SAO syntax elements for the Cb chroma components, and the bypass-coded bins of SAO syntax elements for the Cr chroma component are grouped together within the SAO syntax elements for the Cr chroma components. In this way, the SAO syntax elements may include SAO syntax elements for a plurality of color components. For each color component, video encoder 20 may generate a syntax structure that include the SAO syntax elements for the color component, wherein within the syntax structure, none of the bypass-coded bins for the color component is between two of the regular CABAC-coded bins for the color component.

In other examples, video encoder 20 may group the bypass-coded bins for all color components. For instance, the regular CABAC-coded bins of the SAO elements are coded for the luma and chroma components first. Then, the bypass-coded bins for the components are coded. For example, video encoder 20 may encode regular CABAC-coded bins of the SAO syntax elements for the luma components and regular CABAC-coded bins of the SAO syntax elements for the chroma components. In this example, video encoder 20 may encode, after the regular CABAC-coded bins of the SAO syntax elements for the luma components and CABAC encoding the regular CABAC-coded bins of the SAO syntax elements for the chroma components in coding order, encode bypass-coded bins of the SAO syntax elements for the luma components and bypass encode bypass-coded bins of the SAO syntax elements for the chroma components. Similarly, video decoder 30 may decode regular CABAC-coded bins of the SAO syntax elements for the luma components and regular CABAC-coded bins of the SAO syntax elements for the chroma components. Video decoder 30 may decode, after CABAC the regular CABAC-coded bins of the SAO syntax elements for the luma components and CABAC decoding the regular CABAC-coded bins of the SAO syntax elements for the chroma components in coding order, bypass-coded bins of the SAO syntax elements for the luma components and bypass decode the bypass-coded bins of the SAO syntax elements for the chroma components.

In accordance with at least some of the techniques of this disclosure and at least some of the example syntaxes described above, sao_offset syntax elements may always be coded immediately after sao_type_idx syntax elements. In such examples, the dependency of the syntax to be coded after the sao_type_idx syntax element depending on the value of the sao_type_idx syntax element may be removed.

Decoded picture buffer 114 may store the reconstructed pixel blocks. Inter-prediction unit 121 may use a reference picture that contains the reconstructed pixel blocks to perform inter prediction on PUs of other pictures. In addition, intra-prediction processing unit 126 may use reconstructed pixel blocks in decoded picture buffer 114 to perform intra prediction on other PUs in the same picture as the CU.

Entropy encoding unit 116 may receive data from other functional components of video encoder 20. For example, entropy encoding unit 116 may receive coefficient blocks from quantization unit 106 and may receive syntax elements from prediction processing unit 100. Entropy encoding unit 116 may perform one or more entropy encoding operations on the data to generate entropy-encoded data. For example, entropy encoding unit 116 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. In a particular example, entropy encoding unit 116 may encode the SAO syntax elements generated by filter unit 113. As part of encoding the SAO syntax elements, entropy encoding unit 116 may use regular CABAC engine 118 to encode regular CABAC-coded bins of the SAO syntax elements and may use bypass coding engine 120 to encode the bypass-coded bins.

Video encoder 20 may output a bitstream that includes entropy-encoded data generated by entropy encoding unit 116. In this way, after entropy encoding unit 116 has encoded the SAO syntax elements, video encoder 20 may output the SAO syntax elements in a bitstream that includes an encoded representation of the video data.

Figure 5:
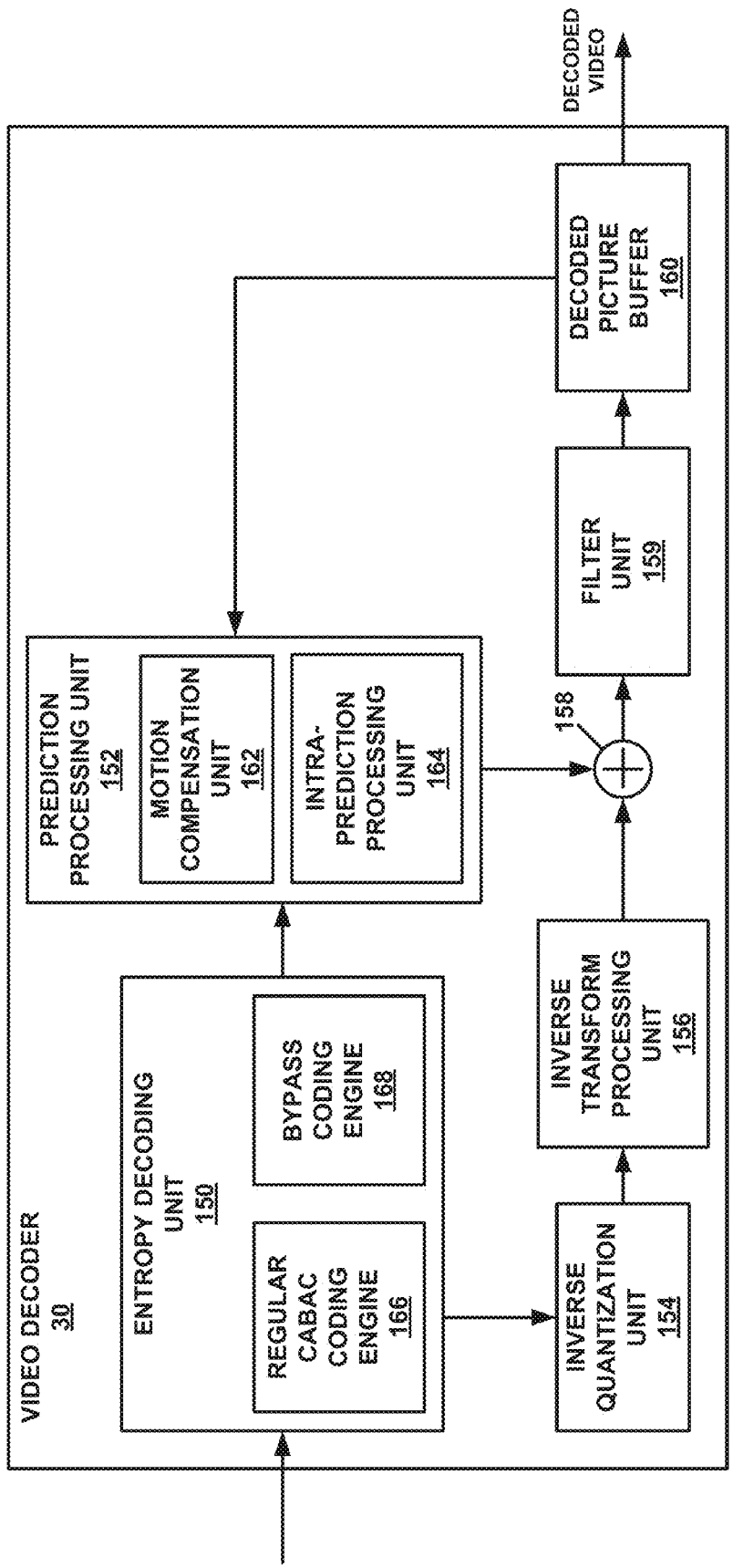
FIG. 5 is a block diagram illustrating an example video decoder that may implement the techniques described in this disclosure.

FIG. 5 is a block diagram that illustrates an example video decoder 30 that is configured to implement the techniques of this disclosure. FIG. 5 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 5, video decoder 30 includes an entropy decoding unit 150, a prediction processing unit 152, an inverse quantization unit 154, an inverse transform processing unit 156, a reconstruction unit 158, a filter unit 159, and a decoded picture buffer 160. Prediction processing unit 152 includes a motion compensation unit 162 and an intra-prediction processing unit 164. Entropy decoding unit 150 includes a regular CABAC coding engine 166 and a bypass coding engine 168. In other examples, video decoder 30 may include more, fewer, or different functional components.

Video decoder 30 may receive a bitstream. Entropy decoding unit 150 may parse the bitstream to extract syntax elements from the bitstream. As part of parsing the bitstream, entropy decoding unit 150 may entropy decode entropy-encoded syntax elements in the bitstream. Prediction processing unit 152, inverse quantization unit 154, inverse transform processing unit 156, reconstruction unit 158, and filter unit 159 may generate decoded video data based on the syntax elements extracted from the bitstream.

The bitstream may include a sequence of coded SAO syntax elements for a CTB. The SAO syntax elements may include regular CABAC-coded bins and bypass-coded bins. In accordance with the techniques of this disclosure, none of the bypass-coded bins is between two of the regular CABAC-coded bins in the sequence of coded SAO syntax elements. Entropy decoding unit 150 may decode the SAO syntax elements. As part of decoding the SAO syntax elements, entropy decoding unit 150 may use regular CABAC coding engine 166 to decode the regular CABAC-coded bins and may use bypass coding engine 168 to decode the bypass-coded bins.

In addition, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual pixel block associated with the CU.

As part of performing a reconstruction operation on a TU of a CU, inverse quantization unit 154 may inverse quantize, i.e. de-quantize, coefficient blocks associated with the TU. Inverse quantization unit 154 may use a QP value associated with the CU of the TU to determine a degree of quantization and, likewise, a degree of inverse quantization for inverse quantization unit 154 to apply.

After inverse quantization unit 154 inverse quantizes a coefficient block, inverse transform processing unit 156 may apply one or more inverse transforms to the coefficient block in order to generate a residual sample block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 164 may perform intra prediction to generate a predictive sample block for the PU. Intra-prediction processing unit 164 may use an intra prediction mode to generate the predictive pixel block for the PU based on the pixel blocks of spatially-neighboring PUs. Intra-prediction processing unit 164 may determine the intra prediction mode for the PU based on one or more syntax elements parsed from the bitstream.

Motion compensation unit 162 may construct a first reference picture list (list 0) and a second reference picture list (list 1) based on syntax elements extracted from the bitstream. Furthermore, if a PU is encoded using inter prediction, entropy decoding unit 150 may extract motion information for the PU. Motion compensation unit 162 may determine, based on the motion information of the PU, one or more reference blocks for the PU. Motion compensation unit 162 may generate, based on the one or more reference blocks for the PU, a predictive pixel block for the PU.

Reconstruction unit 158 may use the residual pixel blocks associated with TUs of a CU and the predictive pixel blocks of the PUs of the CU, i.e., either intra-prediction data or inter-prediction data, as applicable, to reconstruct the pixel block of the CU. In particular, reconstruction unit 158 may add samples of the residual pixel blocks to corresponding samples of the predictive pixel blocks to reconstruct the pixel block of the CU.

Filter unit 159 may perform a deblocking operation to reduce blocking artifacts associated with the pixel blocks of the CUs of a CTB. In addition, filter unit 159 may modify the pixel block of a CTB based on the SAO syntax elements parsed from the bitstream. For instance, filter unit 159 may determine values based on the SAO syntax elements for a CTB and add the determined values to samples in the reconstructed pixel block of the CTB. By modifying at least some of the pixel blocks of CTBs of a picture, filter unit 159 may modify a reconstructed picture of video data based on the SAO syntax elements.

Video decoder 30 may store the pixel block of the CU in decoded picture buffer 160. Decoded picture buffer 160 may provide reference pictures for subsequent motion compensation, intra prediction, and presentation on a display device, such as display device 32 of FIG. 1. For instance, video decoder 30 may perform, based on the pixel blocks in decoded picture buffer 160, intra prediction or inter prediction operations on PUs of other CUs.

Figure 6:
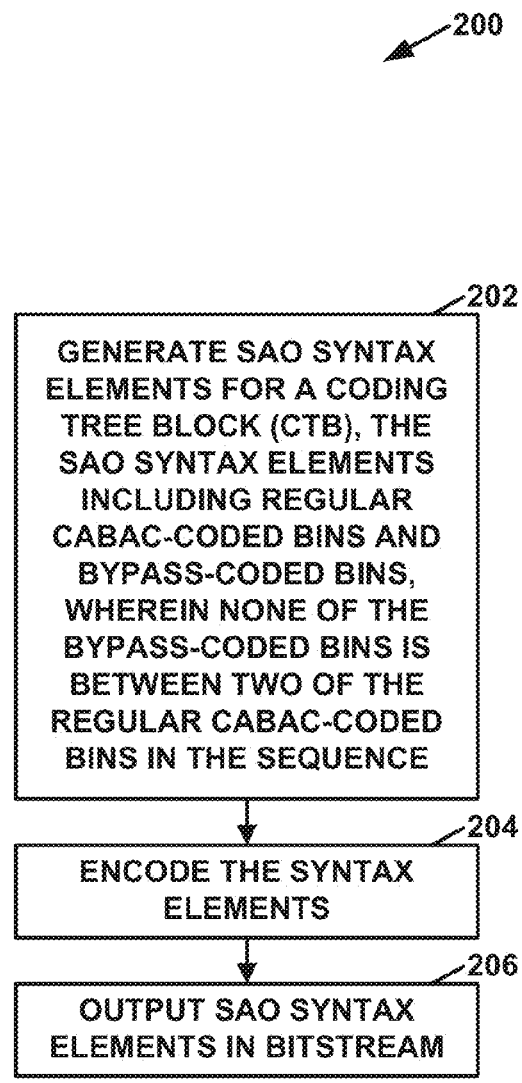
FIG. 6 is a flowchart illustrating an example operation of a video encoder for encoding video data, in accordance with one or more techniques of this disclosure.

FIG. 6 is a flowchart illustrating an example operation 200 of a video encoder for encoding video data, in accordance with one or more techniques of this disclosure. FIG. 6 is provided as an example. In other examples, the techniques of this disclosure may be implemented using more, fewer, or different steps than those shown in the example of FIG. 6.

In the example of FIG. 6, video encoder 20 may generate a sequence of SAO syntax elements for a CTB (202). The SAO syntax elements may include regular CABAC-coded bins for a color component and bypass-coded bins for the color component. Within the sequence, none of the bypass-coded bins for the color component is between two of the regular CABAC-coded bins for the color component. Furthermore, video encoder 20 may entropy encode the SAO syntax elements (204). Encoding the SAO syntax elements may comprise using a regular CABAC engine to encode the regular CABAC-coded bins and using a bypass coding engine to encode the bypass-coded bins. Video encoder 20 may output the SAO syntax elements in a bitstream that includes an encoded representation of the video data (206).

Figure 7:
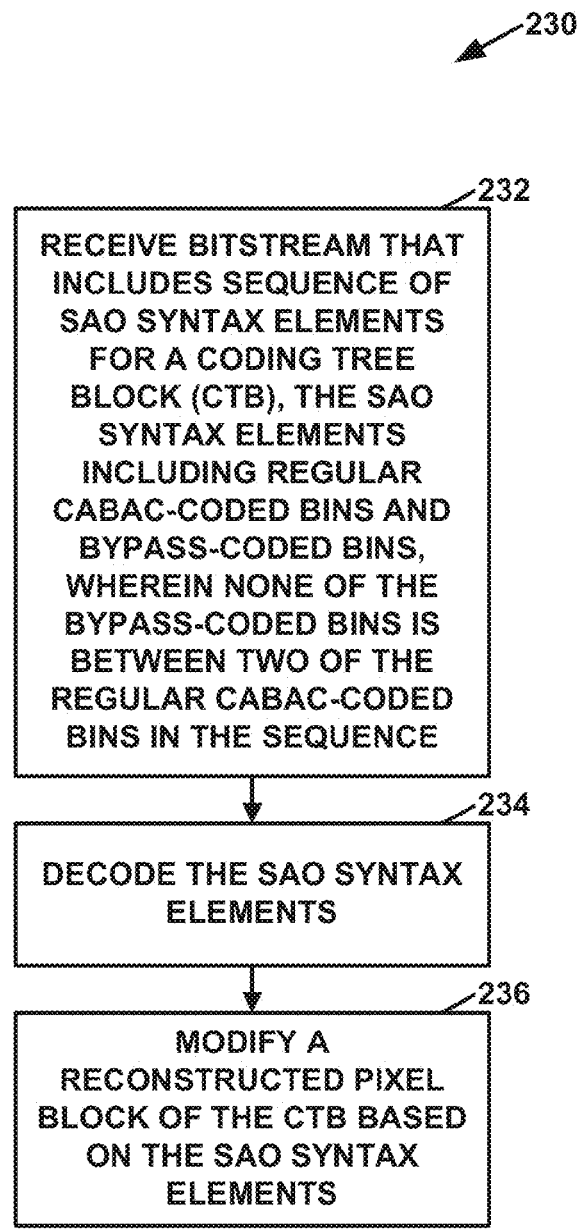
FIG. 7 is a flowchart illustrating an example operation of a video decoder for decoding video data, in accordance with one or more techniques of this disclosure.

FIG. 7 is a flowchart illustrating an example operation 230 of a video decoder for decoding video data, in accordance with one or more techniques of this disclosure. FIG. 7 is provided as an example. In other examples, the techniques of this disclosure may be implemented using more, fewer, or different steps than those shown in the example of FIG. 7.

In the example of FIG. 7, video decoder 30 may receive a bitstream that includes a sequence of coded SAO syntax elements for a CTB (232). The SAO syntax elements may include regular CABAC-coded bins for a color component and bypass-coded bins for the color component. None of the bypass-coded bins for the color component is between two of the regular CABAC-coded bins for the color component. Furthermore, video decoder 30 may entropy decode the SAO syntax elements (234). Decoding the SAO syntax elements may comprise using a regular CABAC engine to decode the regular CABAC-coded bins and using a bypass coding engine to decode the bypass-coded bins. Furthermore, video decoder 30 may modify a reconstructed pixel block of the CTB based on the SAO syntax elements (236).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for encoding video data, the method comprising:
   generating a sequence of sample adaptive offset (SAO) syntax elements for a coding tree block (CTB), wherein, for each color component of a plurality of color components that includes a luma component and a chroma component:
      the sequence of SAO syntax elements includes SAO syntax elements for the color component,
      the SAO syntax elements for the color component includes one or more regular context-adaptive binary arithmetic coding (CABAC)-coded bins and bypass-coded bins, and
      the one or more regular CABAC-coded bins are grouped together and the bypass-coded bins are grouped together;
   encoding the SAO syntax elements, wherein encoding the SAO syntax elements comprises using regular CABAC to encode the one or more regular CABAC-coded bins and using bypass coding to encode the bypass-coded bins,
   wherein encoding the SAO syntax elements comprises, for each color component of the plurality of color components:
      encoding the one or more regular CABAC-coded bins of the SAO syntax elements for the color; and
      encoding, after the one or more regular CABAC-coded bins of the SAO syntax elements for the color component in coding order, the bypass-coded bins of the SAO syntax elements for the color component; and
      outputting the SAO syntax elements in a bitstream that includes an encoded representation of the video data.

2. The method of claim 1, wherein, for each color component of the plurality of color components, none of the bypass-coded bins of the SAO syntax elements for the color component is between two regular CABAC-coded bins of the SAO syntax elements for the color component.

3. The method of claim 1, wherein generating the sequence of SAO syntax elements comprises, for each color component of the plurality of color components, generating the sequence of SAO syntax elements such that none of the bypass-coded bins of the SAO syntax elements for the color component is between two regular CABAC-coded bins of the SAO syntax elements for the color component and such that no regular CABAC-coded bin of the SAO syntax elements for the color component is between two of the bypass-coded bins of the SAO syntax elements for the color component.

4. The method of claim 1, wherein the SAO syntax elements include a SAO on switch, a SAO type index, a plurality of SAO offsets, and a SAO subtype index, the SAO subtype index indicating a direction if the SAO type index indicates an edge offset and a displacement of a band offset if the SAO type index indicates a band offset.

5. The method of claim 1,
wherein the SAO syntax elements include SAO syntax elements for an additional color component, the SAO syntax elements for the additional color component including regular CABAC-coded bins for the additional color component and bypass-coded bins for the additional color component; and
wherein generating the sequence of SAO syntax elements comprises generating a syntax structure that includes the SAO syntax elements for the additional color component, wherein within the syntax structure, none of the bypass-coded bins for the additional color component is between two of the regular CABAC-coded bins for the additional color component.

6. The method of claim 1, wherein encoding the SAO syntax elements comprises, for each color component of the plurality of color components:
encoding a SAO type index for the color component;
encoding, after the SAO type index in coding order, a plurality of SAO offset prefixes for the color component using the one or more regular CABAC-coded bins; and
encoding, after each of the SAO offset prefixes for the color component in coding order, a plurality of SAO offset suffixes for the color component using one or more of the bypass-coded bins.

7. The method of claim 6, further comprising, for each color component of the plurality of color components:
encoding, after the plurality of SAO offset suffixes for the color component in coding order, a plurality of SAO offset signs for the color component; and
encoding, after the plurality of SAO offset signs for the color component in coding order, a SAO band position for the color component.

8. The method of claim 6, wherein the SAO offset prefixes for the color component are truncated unary prefixes and the SAO offset suffixes for the color component are fixed-length codes.

9. The method of claim 6, wherein the SAO offset suffixes for the color component are exponential Golomb codes or Rice-Golomb codes.

10. The method of claim 1, wherein for each color component of the plurality of color components, the bypass-coded bins of the SAO syntax elements for the color component include SAO offsets.

11. A video encoding device that comprises:
a data storage medium configured to store video data; and
one or more processors configured to:
generate a sequence of sample adaptive offset (SAO) syntax elements for a coding tree block (CTB), wherein, for each color component of a plurality of color components that includes a luma component and a chroma component:
the sequence of SAO syntax elements includes SAO syntax elements for the color component,
the SAO syntax elements for the color component includes one or more regular context-adaptive binary arithmetic coding (CABAC)-coded bins and bypass-coded bins, and
the one or more regular CABAC-coded bins are grouped together and the bypass-coded bins are grouped together;
encode the SAO syntax elements, wherein encoding the SAO syntax elements comprises using regular CABAC to encode the one or more regular CABAC-coded bins and using bypass coding to encode the bypass-coded bins,
wherein the one or more processors are configured such that, as part of encoding the SAO syntax elements, for each color component of the plurality of color components, the one or more processors:
encode the one or more regular CABAC-coded bins of the SAO syntax elements for the color component; and
encode, after the one or more regular CABAC-coded bins of the SAO syntax elements for the color component, the bypass-coded bins of the SAO syntax elements for the color component; and
output the SAO syntax elements in a bitstream that includes an encoded representation of the video data.

12. The video encoding device of claim 11, wherein, for each color component of the plurality of color components, none of the bypass-coded bins of the SAO syntax elements for the color component is between two regular CABAC-coded bins of the SAO syntax elements for the color component.

13. The video encoding device of claim 11, wherein the one or more processors are configured to generate the sequence of SAO syntax elements such that, for each color component of the plurality of color components, none of the bypass-coded bins of the SAO syntax elements for the color component is between two regular CABAC-coded bins of the SAO syntax elements for the color component and such that no regular CABAC-coded bin of the SAO syntax elements for the color component is between two of the bypass-coded bins of the SAO syntax elements for the color component.

14. The video encoding device of claim 11, wherein the SAO syntax elements include a SAO on switch, a SAO type index, a plurality of SAO offsets, and a SAO subtype index, the SAO subtype index indicating a direction if the SAO type index indicates an edge offset and a displacement of a band offset if the SAO type index indicates a band offset.

15. The video encoding device of claim 11,
wherein the SAO syntax elements include SAO syntax elements for an additional color component, the SAO syntax elements for the additional color component including regular CABAC-coded bins for the additional color component and bypass-coded bins for the additional color component; and
wherein the one or more processors are configured to generate a syntax structure that includes the SAO syntax elements for the additional color component, wherein within the syntax structure, none of the bypass-coded bins for the additional color component is between two of the regular CABAC-coded bins for the additional color component.

16. The video encoding device of claim 11, wherein, for each color component of the plurality of color components, the one or more processors are configured to generate the sequence of SAO syntax elements at least in part by:

encoding a SAO type index for the color component;
encoding, after the SAO type index in coding order, a plurality of SAO offset prefixes for the color component using the one or more regular CABAC-coded bins; and
encoding, after each of the SAO offset prefixes for the color component in coding order, a plurality of SAO offset suffixes for the color component using one or more of the bypass-coded bins.

17. The video encoding device of claim 16, wherein, for each color component of the plurality of color components, the one or more processors are further configured to:
encode, after the plurality of SAO offset suffixes for the color component in coding order, a plurality of SAO offset signs for the color component; and
encode, after the plurality of SAO offset signs for the color component in coding order, a SAO band position for the color component.

18. The video encoding device of claim 16, wherein the SAO offset prefixes for the color component are truncated unary prefixes and the SAO offset suffixes for the color component are fixed-length codes.

19. The video encoding device of claim 16, wherein the SAO offset suffixes for the color component are exponential Golomb codes or Rice-Golomb codes.

20. The video encoding device of claim 11, wherein, for each color component of the plurality of color components, the bypass-coded bins of the SAO syntax elements for the color component include SAO offsets.

21. A video encoding device comprising:
means for generating a sequence of sample adaptive offset (SAO) syntax elements for a coding tree block (CTB), wherein, for each color component of a plurality of color components that includes a luma component and a chroma component:
the sequence of SAO syntax elements includes SAO syntax elements for the color component,
the SAO syntax elements for the color component includes one or more regular context-adaptive binary arithmetic coding (CABAC)-coded bins and bypass-coded bins, and
the one or more regular CABAC-coded bins are grouped together and the bypass-coded bins are grouped together;
means for encoding the SAO syntax elements, wherein encoding the SAO syntax elements comprises means for using regular CABAC to encode the one or more regular CABAC-coded bins and means for using bypass coding to encode the bypass-coded bins,
wherein the means for encoding the SAO syntax elements comprises, for each color component of the plurality of color components:
means for encoding the one or more regular CABAC-coded bins of the SAO syntax elements for the color component; and
means for encoding, after the one or more regular CABAC-coded bins of the SAO syntax elements for the color component, the bypass-coded bins of the SAO syntax elements for the color component; and
means for outputting the SAO syntax elements in a bitstream that includes an encoded representation of video data.

22. A non-transitory computer-readable storage medium that stores instructions that, when executed by one or more processors of a video encoding device, configure the video encoding device to:
generate a sequence of sample adaptive offset (SAO) syntax elements for a coding tree block (CTB), wherein, for each color component of a plurality of color components that includes a luma component and a chroma component:
the sequence of SAO syntax elements includes SAO syntax elements for the color component,
the SAO syntax elements for the color component includes one or more regular context-adaptive binary arithmetic coding (CABAC)-coded bins and bypass-coded bins, and
the one or more regular CABAC-coded bins are grouped together and the bypass-coded bins are grouped together;
encode the SAO syntax elements, wherein the instructions configuring the video encoding device to encode the SAO syntax elements comprise instructions that, when executed by the one or more processors, configure the video encoding device to use regular CABAC to encode the one or more regular CABAC-coded bins and to use bypass coding to encode the bypass-coded bins,
wherein the instructions configuring the video encoding device to encode the SAO syntax elements configure the video encoding device to, for each color component of the plurality of color components:
encode the one or more regular CABAC-coded bins of the SAO syntax elements for the color component; and
encode, after the one or more regular CABAC-coded bins of the SAO syntax elements for the color component in coding order, the bypass-coded bins of the SAO syntax elements for the color component; and
output the SAO syntax elements in a bitstream that includes an encoded representation of video data.

23. A method for decoding video data, the method comprising:
receiving a bitstream that includes a sequence of coded sample adaptive offset (SAO) syntax elements for a coding tree block (CTB), wherein, for each color component of a plurality of color components that includes a luma component and a chroma component:
the sequence of SAO syntax elements includes SAO syntax elements for the color component,
the SAO syntax elements for the color component includes one or more regular context-adaptive binary arithmetic coding (CABAC)-coded bins and bypass-coded bins, and
the one or more regular CABAC-coded bins are grouped together and the bypass-coded bins are grouped together;
decoding the SAO syntax elements, wherein decoding the SAO syntax elements comprises using regular CABAC to decode the one or more regular CABAC-coded bins and using bypass coding to decode the bypass-coded bins,
wherein decoding the SAO syntax elements comprises, for each color component of the plurality of color components:
decoding the one or more regular CABAC-coded bins of the SAO syntax elements for the color component; and
decoding, after the one or more regular CABAC-coded bins of the SAO syntax elements for the color component in coding order, the bypass-coded bins of the SAO syntax elements for the color component; and
modifying a reconstructed pixel block of the CTB based on the SAO syntax elements.

24. The method of claim 23, wherein, for each color component of the plurality of color components, none of the bypass-coded bins of the SAO syntax elements for the color component is between two regular CABAC-coded bins of the SAO syntax elements for the color component.

25. The method of claim 23, wherein, for each color component of the plurality of color components, none of the bypass-coded bins of the SAO syntax elements for the color component is between two regular CABAC-coded bins of the SAO syntax elements for the color component and such that no regular CABAC-coded bin of the SAO syntax elements for the color component is between two of the bypass-coded bins of the SAO syntax elements for the color component.

26. The method of claim 23, wherein the SAO syntax elements include a SAO on switch, a SAO type index, a plurality of SAO offsets, and a SAO subtype index, the SAO subtype index indicating a direction if the SAO type index indicates an edge offset and a displacement of a band offset if the SAO type index indicates a band offset.

27. The method of claim 23,
wherein the SAO syntax elements include SAO syntax elements for an additional color component, the SAO syntax elements for the additional color component including regular CABAC-coded bins for the additional color component and bypass-coded bins for the additional color component; and
wherein the bitstream includes a syntax structure that includes the SAO syntax elements for the additional color component, wherein within the syntax structure, none of the bypass-coded bins for the additional color component is between two of the regular CABAC-coded bins for the additional color component.

28. The method of claim 23, wherein decoding the SAO syntax elements comprises, for each color component of the plurality of color components:
decoding a SAO type index for the color component;
decoding, after the SAO type index in coding order, a plurality of SAO offset prefixes for the color component using the one or more regular CABAC-coded bins; and
decoding, after each of the SAO offset prefixes for the color component in coding order, a plurality of SAO offset suffixes for the color component using one or more of the bypass-coded bins.

29. The method of claim 28, further comprising, for each color component of the plurality of color components:
decoding, after the plurality of SAO offset suffixes for the color component in coding order, a plurality of SAO offset signs for the color component; and
decoding, after the plurality of SAO offset signs for the color component in coding order, a SAO band position for the color component.

30. The method of claim 28, wherein the SAO offset prefixes for the color component are truncated unary prefixes and the SAO offset suffixes for the color component are fixed-length codes.

31. The method of claim 28, wherein the SAO offset suffixes for the color component are exponential Golomb codes or Rice-Golomb codes.

32. The method of claim 23, wherein, for each color component of the plurality of color components, the bypass-coded bins of the SAO syntax elements for the color component include SAO offsets.

33. A video decoding device that comprises:
a data storage medium configured to store video data and one or more processors configured to:
receive a bitstream that includes an encoded representation of the video data, the bitstream including a sequence of coded sample adaptive offset (SAO) syntax elements for a coding tree block (CTB), wherein, for each color component of a plurality of color components that includes a luma component and a chroma component:
the sequence of SAO syntax elements includes SAO syntax elements for the color component,
the SAO syntax elements for the color component includes one or more regular context-adaptive binary arithmetic coding (CABAC)-coded bins bypass-coded bins, and
the one or more regular CABAC-coded bins are grouped together and the bypass-coded bins are grouped together;
decode the SAO syntax elements, wherein decoding the SAO syntax elements comprises using regular CABAC to decode the one or more regular CABAC-coded bins and using bypass coding to decode the bypass-coded bins,
wherein the one or more processors are configured such that, as part of decoding the SAO syntax elements, for each color component of the plurality of color components, the one or more processors:
decode the one or more regular CABAC-coded bins of the SAO syntax elements for the color component; and
decode, after the one or more regular CABAC-coded bins of the SAO syntax elements for the color component, the bypass-coded bins of the SAO syntax elements for the color component; and
modify a reconstructed picture of the video data based on the SAO syntax elements.

34. The video decoding device of claim 33, wherein, for each color component of the plurality of color components, none of the bypass-coded bins of the SAO syntax elements for the color component is between two regular CABAC-coded bins of the SAO syntax elements for the color component.

35. The video decoding device of claim 33, wherein, for each color component of the plurality of color components, none of the bypass-coded bins of the SAO syntax elements for the color component is between two regular CABAC-coded bins of the SAO syntax elements for the color component and no regular CABAC-coded bin of the SAO syntax elements for the color component is between two of the bypass-coded bins of the SAO syntax elements for the color component.

36. The video decoding device of claim 33, wherein the SAO syntax elements include a SAO on switch, a SAO type index, a plurality of SAO offsets, and a SAO subtype index, the SAO subtype index indicating a direction if the SAO type index indicates an edge offset and a displacement of a band offset if the SAO type index indicates a band offset.

37. The video decoding device of claim 33,
wherein the SAO syntax elements include SAO syntax elements for an additional color component, the SAO syntax elements for the additional color component including regular CABAC-coded bins for the additional color component and bypass-coded bins for the additional color component; and
wherein the bitstream includes a syntax structure that includes the SAO syntax elements for the additional color component, wherein within the syntax structure, none of the bypass-coded bins for the additional color component is between two of the regular CABAC-coded bins for the additional color component.

38. The video decoding device of claim 33, wherein, for each color component of the plurality of color components, the one or more processors are configured to:

decode a SAO type index for the color component;
decode, after the SAO type index in coding order, a plurality of SAO offset prefixes for the color component using the one or more regular CABAC-coded bins; and
decode, after each of the SAO offset prefixes for the color component in coding order, a plurality of SAO offset suffixes for the color component using one or more of the bypass-coded bins.

39. The video decoding device of claim 38, wherein the one or more processors are configured to:
decode, after the plurality of SAO offset suffixes for the color component in coding order, a plurality of SAO offset signs for the color component; and
decode, after the plurality of SAO offset signs in coding order, a SAO band position.

40. The video decoding device of claim 38, wherein the SAO offset prefixes for the color component are truncated unary prefixes and the SAO offset suffixes for the color component are fixed-length codes.

41. The video decoding device of claim 38, wherein the SAO offset suffixes are exponential Golomb codes or Rice-Golomb codes.

42. The video decoding device of claim 33, wherein, for each color component of the plurality of color components, the bypass-coded bins of the SAO syntax elements for the color component include SAO offsets.

43. A video decoding device comprising:
means for receiving a bitstream that includes a sequence of coded sample adaptive offset (SAO) syntax elements for a coding tree block (CTB), wherein, for each color component of a plurality of color components that includes a luma component and a chroma component:
the sequence of SAO syntax elements includes SAO syntax elements for the color component,
the SAO syntax elements for the color component includes one or more regular context-adaptive binary arithmetic coding (CABAC)-coded bins and bypass-coded bins, and
the one or more regular CABAC-coded bins are grouped together and the bypass-coded bins are grouped together;
means for decoding the SAO syntax elements, wherein the means for decoding the SAO syntax elements comprises means for using regular CABAC to decode the one or more regular CABAC-coded bins and means for using bypass coding to decode the bypass-coded bins,
wherein the means for decoding the SAO syntax elements comprises, for each color component of the plurality of color components:
means for decoding the one or more regular CABAC-coded bins of the SAO syntax elements for the color component; and
means for decoding, after the one or more regular CABAC-coded bins of the SAO syntax elements for the color component, the bypass-coded bins of the SAO syntax elements for the color component; and
means for modifying a reconstructed picture of video data based on the SAO syntax elements.

44. A non-transitory computer-readable storage medium that stores instructions that, when executed by one or more processors of a video decoding device, configure the video decoding device to:
receive a bitstream that includes a sequence of coded sample adaptive offset (SAO) syntax elements for a coding tree block (CTB), wherein, for each color component of a plurality of color components that includes a luma component and a chroma component:
the sequence of SAO syntax elements includes SAO syntax elements for the color component,
the SAO syntax elements for the color component includes one or more regular context-adaptive binary arithmetic coding (CABAC)-coded bins and bypass-coded bins, and
the one or more regular CABAC-coded bins are grouped together and the bypass-coded bins are grouped together;
decode the SAO syntax elements, wherein the instructions configuring the video decoding device to decode the SAO syntax elements comprise instructions that, when executed by the one or more processors, configure the video decoding device to use regular CABAC to decode the one or more regular CABAC-coded bins and to use bypass coding to decode the bypass-coded bins,
wherein the instructions configuring the video decoding device to decode the SAO syntax elements configure the video decoding device to, for each color component of the plurality of color components:
decode the one or more regular CABAC-coded bins of the SAO syntax elements for the color component; and
decode, after the one or more regular CABAC-coded bins of the SAO syntax elements for the color component in coding order, the bypass-coded bins of the SAO syntax elements for the color component; and
modify a reconstructed picture of video data based on the SAO syntax elements.

45. The video encoding device of claim 11, wherein the video encoding device comprises at least one of:
an integrated circuit;
a microprocessor; or
a wireless handset.

46. The video decoding device of claim 33, wherein the video decoding device comprises at least one of:
an integrated circuit;
a microprocessor; or
a wireless handset.

47. The video decoding device of claim 33, further comprising a display configured to display decoded video data.

48. The video encoding device of claim 11, further comprising a camera configured to capture the video data.

* * * * *